United States Patent
Shirsat et al.

(10) Patent No.: US 11,989,034 B2
(45) Date of Patent: May 21, 2024

(54) SYSTEMS AND METHODS FOR DECENTRALIZED MULTI-TARGET TRACKING WITH MULTIPLE ROBOTS USING A PHD FILTER

(71) Applicants: Aniket Shirsat, Tempe, AZ (US); Spring Berman, Scottsdale, AZ (US)

(72) Inventors: Aniket Shirsat, Tempe, AZ (US); Spring Berman, Scottsdale, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 169 days.

(21) Appl. No.: 17/820,823

(22) Filed: Aug. 18, 2022

(65) Prior Publication Data
US 2023/0082256 A1    Mar. 16, 2023

Related U.S. Application Data

(60) Provisional application No. 63/234,532, filed on Aug. 18, 2021.

(51) Int. Cl.
G05D 1/00    (2024.01)

(52) U.S. Cl.
CPC ............ *G05D 1/0287* (2013.01); *G05D 1/00* (2013.01); *G05D 1/104* (2013.01)

(58) Field of Classification Search
None
See application file for complete search history.

(56) References Cited

U.S. PATENT DOCUMENTS

2020/0265591 A1*    8/2020    Yang .................. G06T 7/223

OTHER PUBLICATIONS

Achtelik et al., Autonomous Navigation and Exploration of a Quadrotor Helicopter in GPS-denied Indoor Environments, Technische Universitat Munchen, Germany, 2009.
Buhmann et al., The Mobile Robot RHINO, AI Magazine, vol. 16, No. 2, AAAI, 1995.
Burgard et al., Coordinated Multi-Robot Exploration, IEEE Transactions on Robotics, vol. 21, No. 3, Jun. 2005.
Clark, D. E., Panta, K., and Vo, B.-N., "The GM-PHD filter multiple target tracker," 2006 9th International Conference on Information Fusion, IEEE, 2006, pp. 1-8.
Dames et al., Cooperative multi-target localization with noisy sensors, 2013 IEEE International Conference on Robotics and Automation (ICRA), IEEE, 2013, pp. 1877-1883.
Dames, Distributed multi-target search and tracking using the PHD filter, Autonomous Robbots, pp. 1-27, 2019.
Grocholsky et al., Cooperative Air and Ground Surveillance, a Scalable Approach to the Detection and Localization of Targets by a Network of UAVs and UGVs, IEEE Robotics & Automation Magazine, Sep. 2006.
Howard et al., Experiments with a Large Heterogeneous Mobile Robot Team: Exploration, Mapping, Deployment and Detection, the International Journal of Robotics Research, vol. 25, No. 5-6, May-Jun. 2006, pp. 431-447, 2006.

(Continued)

*Primary Examiner* — Peter D Nolan
*Assistant Examiner* — Michael F Whalen
(74) *Attorney, Agent, or Firm* — POLSINELLI PC

(57) ABSTRACT

Various embodiments for systems and methods for decentralized multi-target tracking with multiple robots using a PHD filter are disclosed herein.

20 Claims, 14 Drawing Sheets

(56) References Cited

OTHER PUBLICATIONS

Hung et al., A scalable, decentralised large-scale network of mobile robots for multi-target tracking, Intelligent Autonomous Systems 13, Springer, 2016, pp. 621-637.

Husain et al., Mapping Planetary Caves with an Autonomous, Heterogeneous Robot Team, IEEE Xplore, 2012.

Jensfelt et al., Active Global Localization for a Mobile Robot Using Multiple Hypothesis Tracking, IEEE Transactions on Robotics and Automation, vol. 17, No. 5, Oct. 2001.

Kamath et al., Triangulation based multi target tracking with mobile sensor networks, Proceedings 2007 IEEE International Conference on Robotics and Automation, IEEE, 2007, pp. 3283-3288.

Mahler, Multitarget Bayes filtering via first-order multitarget moments, IEEE Transactions on Aerospace and Electronic systems, vol. 39, No. 4, 2003, pp. 1152-1178.

Michael et al., Collaborative Mapping of an Earthquake Damaged Building via Ground and Aerial Robots, Field and Service Robotics, 2014.

Reid, An Algorithm for Tracking Multiple Targets, IEEE Transactions on Automatic Control. vol. AC24, No. 6, Dec. 1979.

Schul et al., Tracking multiple moving objects with a mobile robot, Proceedings of the 2001 IEEE Computer Society Conference on Computer Vision and Pattern Recognition. CVPR 2001, vol. 1, IEEE, 2001.

Shirsat et al., Multi-Robot Target Search using Probabilistic Consensus on Discrete Markov Chains, 2020. Accepted to the IEEE International Symposium on Safety, Security, and Rescue Robotics (SSRR). Preprint available at: https://www.researchgate.net/publication/344324268.

Simmons et al., Coordination for Multi-robot Exploration and Mapping, AAAI-00 Proceedings, 2000.

Sung et al., Algorithm for searching and tracking an unknown and varying number of mobile targets using a limited fov sensor, 2017 IEEE International Conference on Robotics and Automation (ICRA), IEEE, 2017, pp. 6246-6252.

Vo et al., The Gaussian mixture probability hypothesis density filter, IEEE Transactions on Signal Processing, vol. 54, No. 11, 2006, pp. 4091-4104.

Grimmett, G., and Stirzaker, D., Probability and random processes, Oxford University Press, 2001.

Horn, R. A., and Johnson, C. R., Matrix analysis, Cambridge University Press, 1990.

Levin, D. A., and Peres, Y., Markov chains and mixing times, vol. 107, American Mathematical Society, 2017.

Mahler, R., Hall, D., and Llinas, J., "Random set theory for target tracking and identification," Data Fusion Hand Book, CRC Press Boca Raton, 2001, p. 14.

Mahler, R. P., Statistical multisource-multitarget information fusion, vol. 685, Artech House Norwood, MA, 2007.

Ross, S. M., Introduction to probability models, Academic Press, 2014.

Serfozo, R., Basics of applied stochastic processes, Springer Science & Business Media, 2009.

* cited by examiner 400 (CONT'D)

420 — ESTIMATE A QUANTITY OF DETECTED TARGET ITEMS AND A RESPECTIVE POSITION OF EACH DETECTED TARGET ITEM WITHIN A FIELD OF VIEW OF THE SENSOR OF THE ROBOT USING A PROBABILITY HYPOTHESIS DENSITY FILTER MODEL

430 — UPDATE THE FIRST OBSERVATION SET WITH A UNION OF THE FIRST OBSERVATION SET AND A SECOND OBSERVATION SET RECEIVED FROM A SECOND ROBOT, INCLUDING A LOCAL ESTIMATE VALUE OF THE QUANTITY OF DETECTED TARGET ITEMS AND A RESPECTIVE POSITION OF EACH DETECTED TARGET ITEM IN A RENEWAL-REWARD PROCESS

432 — TRANSMIT INFORMATION INDICATIVE OF THE FIRST OBSERVATION SET HELD BY THE ROBOT AT TIME K, THE FIRST OBSERVATION SET INCLUDING A STATE FOR EACH DETECTED TARGET ITEM OF A FIRST SUBSET OF DETECTED TARGET ITEMS OBSERVED BY THE FIRST ROBOT

434 — RECEIVE INFORMATION INDICATIVE OF THE SECOND OBSERVATION SET HELD BY A SECOND ROBOT AT TIME K, THE OBSERVATION SET INCLUDING A STATE FOR EACH DETECTED TARGET ITEM OF A SECOND SUBSET OF DETECTED TARGET ITEMS OBSERVED BY THE SECOND ROBOT

FIG. 9C

SYSTEMS AND METHODS FOR DECENTRALIZED MULTI-TARGET TRACKING WITH MULTIPLE ROBOTS USING A PHD FILTER

CROSS-REFERENCE TO RELATED APPLICATIONS

This is a U.S. Non-Provisional Patent Application that claims benefit to U.S. Provisional Patent Application Ser. No. 63/234,532 filed 18 Aug. 2021 which is herein incorporated by reference in its entirety.

FIELD

The present disclosure generally relates to multi-target tracking with robots, and particularly to systems and methods for decentralized multi-target tracking with multiple robots using a PHD filter.

BACKGROUND

Mobile ground robots and aerial robots have often been used for exploration and mapping tasks. Heterogeneous teams of ground and aerial robots have been employed for applications that involve mapping an environment, such as disaster response and surveillance. Such tasks require the robots to track features of interest that are present in the environment. Mobile robots, especially quadrotors, are subject to limitations on their operation due to constraints on the payloads that they can carry, including power, sensing and communication devices for transmitting information to other robots and/or to a command center. Many multi-robot control strategies rely on a centralized communication network for coordination. For example, some multi-robot exploration strategies rely on constant two-way communication between the robots and a central node. Since a centralized communication architecture is required, these strategies do not scale well with the robot population size, as the communication bandwidth becomes a bottleneck with increasing numbers of robots. Moreover, a failure of the central node causes loss of communication for all the robots. Decentralized multi-robot control strategies can be used to overcome these limitations. Such strategies involve only local communication between robots and scale well with the number of robots. However, communication among robots can become unreliable as the number of robots increases, and the communication network connectivity may be disrupted by the environment or by the movement of robots beyond communication range.

Multi-target tracking is an established field of research with origins in the study of point processes with most early applications in radar and sonar-based tracking. In real-world scenarios, there is often uncertainty in the existence, locations, and dynamics of targets, as well as uncertainty in sensor measurements of targets that arise from sensor noise and false detections (clutter) around the real targets. Random Finite Set (RFS) models provide a probabilistic framework for multi-target tracking that can account for these uncertainties and ensure statistical guarantees on the accuracy of the estimated number of targets and their states. Unlike RFS-based estimators, many classical probabilistic multi-target tracking approaches require techniques for data association, which is computationally intensive. Such conventional approaches include multiple hypothesis tracking in which an exhaustive search on all possible combinations of tracks and data associations is performed, and joint probabilistic data association. Foundational works are directed to estimation methods based on Random Finite Sets, and such works have made concepts from point process theory for multi-target tracking more accessible to engineering disciplines. One paper presents an implementation of a multi-target tracking approach as a probability hypothesis density (PHD) filter and provides examples of scenarios with targets that follow either linear or nonlinear motion models. In addition, a PHD filter-based approach has been proposed for simultaneous search and tracking of an unknown number of moving targets by a single robot with a limited sensing field of view. There have also been works on multi-target search and tracking using multi-robot systems with communication networks that are always connected and that use decentralized controllers to maintain connectivity. In real-world applications, constraints on the robots' communication ranges limit the area that the robots can explore. Previous works also present a consensus-based target search strategy for multiple robots that do not require the robots to maintain a connected communication network. The robots search for a static target while performing random walks on a discretization of the environment according to a discrete-time discrete-state (DTDS) Markov chain model. This strategy has proven to achieve consensus, defined as the robots' agreement on the presence of the target; however, such previous works do not consider scenarios with multiple targets in the environment.

It is with these observations in mind, among others, that various aspects of the present disclosure were conceived and developed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 9A-9C are a series of process flow diagrams showing a method for implementation of a control and target estimate strategy for the robot of FIGS. 1A-1C.

Corresponding reference characters indicate corresponding elements among the view of the drawings. The headings used in the figures do not limit the scope of the claims.

DETAILED DESCRIPTION

The present disclosure presents a solution for scenarios in which a plurality of robots are collectively tasked with tracking multiple stationary targets in an unknown, bounded environment. In one aspect of a system 100 described herein, a plurality of robots 102 search for targets along a spatial grid overlaid on the environment while performing a random walk on this grid modeled by a discrete-time discrete-state (DTDS) Markov chain. Each robot 102 can transmit its estimate of locations of targets to other robots 102 that occupy their current location on the grid; thus, their communication network is time-varying and not necessarily connected. The search procedure is modeled as a renewal-reward process on the underlying DTDS Markov chain. To accommodate changes in the set of targets observed by each respective robot 102 as it explores the environment, along with uncertainties in the measurements of the targets taken by the robot 102, the tracking problem is formulated in terms of Random Finite Sets (RFS). In another aspect, the robots 102 use RFS-based Probability Hypothesis Density (PHD) filters to estimate the number of targets and their locations. The present disclosure also provides a theoretical estimation framework, based on the Gaussian Mixture formulation of the PHD filter, and preliminary simulation results toward extending existing approaches for RFS-based multi-target tracking to a decentralized multi-robot strategy for multi-target tracking. This inventive approach has been validated with simulations of multi-target tracking scenarios with different densities of robots and targets, and the average time required for the robots evaluated in each scenario to reach agreement on a common set of targets.

Figure 1A:
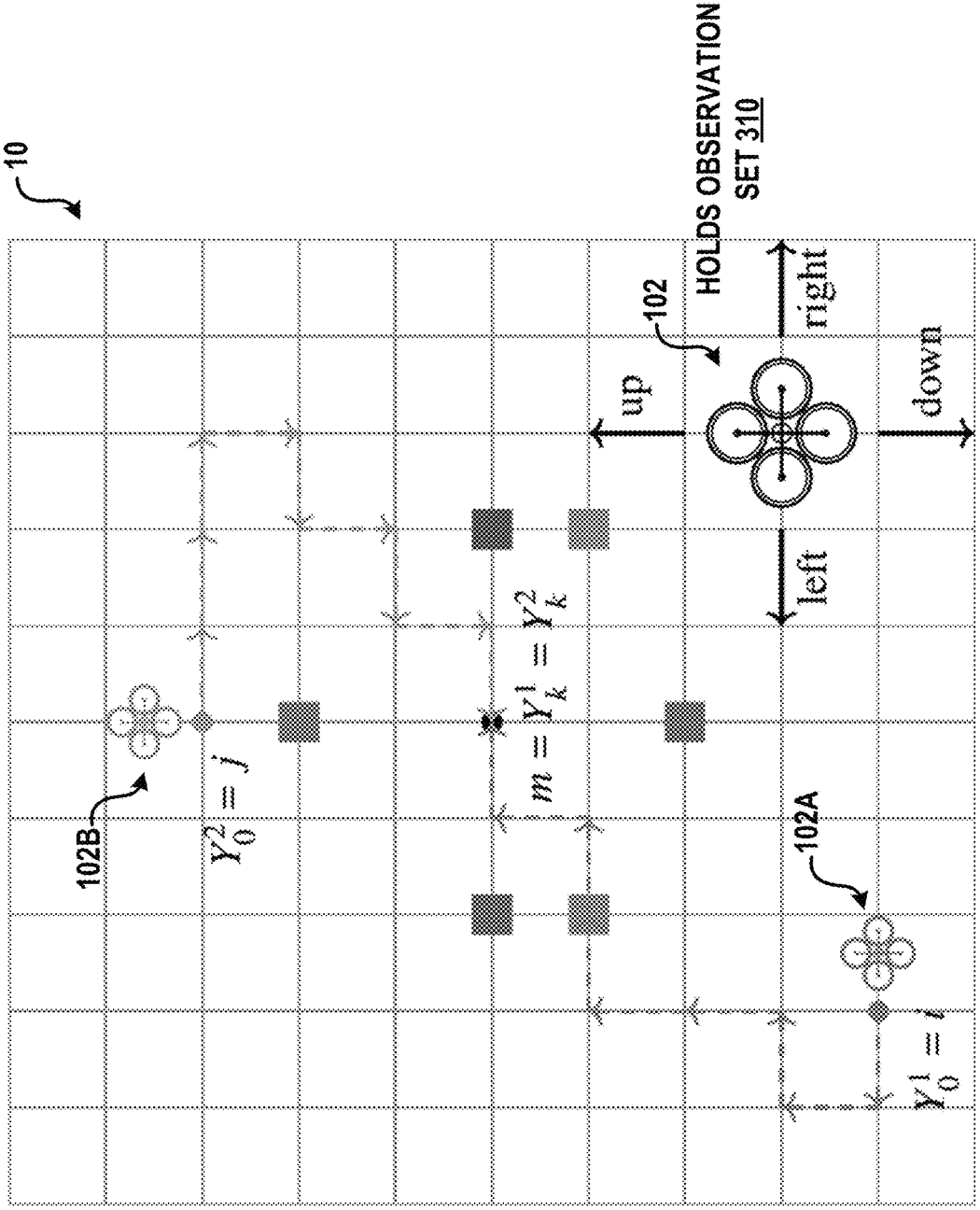
FIGS. 1A-1C are a series of simplified diagrams showing is an illustration showing a multi-target strategy illustrating sample paths for two or more robots on a square grid in which the robots search the environment for a set of static target, represented by the squares, as the robots perform a random walk on the grid.

The solution described in the present disclosure addresses the problem of tracking multiple targets without requiring a connected communication network using a multi-robot search strategy with the same probabilistic motion model and inter-robot communication constraints. In one aspect, the solution is designed for scenarios in which the robots 102 move according to a DTDS Markov chain model on a finite spatial grid, as illustrated in FIG. 1A, while searching for multiple stationary targets. Each respective robot 102 detects the presence of a target by obtaining sensor measurements of the target's states. It is assumed that the robots' sensors have limited fields of view and that the robots share information about the targets only with other robots within their local communication range. In addition, the multi-robot target tracking procedure is modeled as a renewal-reward process in which the reward is defined as the estimated number of targets and the targets' states, such as their spatial locations.

The main theoretical results that are proved to facilitate the solution described in the present disclosure are the following:

1) Given a plurality of robots 102 that explore an unknown bounded environment according to a DTDS Markov motion model, encounters of a robot 102 with any other robot 102 up to a specific time can be characterized as a renewal process.
2) Using the Gaussian Mixture approximation of the PHD filter, under the constraint of local inter-robot communication, all robots 102 eventually track the number of targets in the environment and their estimated states.

Problem Formulation

Consider an unknown, bounded environment that contains a finite, non-zero number of static targets, indexed by the set $I \subset \mathbb{Z}_+$. The environment is discretized into a square grid, and the four vertices of each grid cell are referred to as nodes. Let $\mathcal{S} \subset \mathbb{Z}_+$ denote the set of S nodes, and let $\mathcal{G}_\mathcal{S} = (\mathcal{V}_\mathcal{S}, \mathcal{E}_\mathcal{S})$ be an undirected graph associated with this grid, where $\mathcal{V}_\mathcal{S}$ is the set of nodes and $\mathcal{E}_\mathcal{S}$ is the set of edges $(i, j)$ that signify the pairs of nodes $i,j \in \mathcal{V}_\mathcal{S}$ between which the robots 102 can travel. The system 100 includes the plurality of robots 102 (for a total quantity of N robots), indexed by the set $\mathcal{N}$, where the plurality of robots 102 explore the environment using a random walk strategy; each respective robot 102 performs a random walk on the grid, moving from a current node i to an adjacent node j with transition probability $p_{ij}$ at each discrete time k. It is assumed that each respective robot 102 is able to localize itself in this environment; i.e., that each respective robot 102 knows which node it currently occupies. It is also assumed that the plurality of robots 102 can communicate with one another only if they occupy the same node (e.g., within their local communication range).

Each robot 102 updates an estimate of the number of targets present within the environment at every time step k. Let the $i^{th}$ target detected by a robot 102 $a_j$ at time k be $m_{i,k}^{a_j} \in \mathbb{R}_+$ which is a tuple including the state of the target, which is a time-varying property of the target such as its location within a field of view (FoV) of the robot 102, the pixels that it occupies in a camera image captured by the robot 102, and a unique identification label. Let $\mathcal{M}_k^{a_i} = \{m_{1,k}^{a_i}, \ldots, m_{n_{m,k}}^{a_i}\}$ be a set of states of all targets detected by the robot 102 $a_j$ at time k, where $n_m$ is the maximum number of features that the robot 102 can detect simultaneously. The value of $n_m$ is limited by the computational capabilities and the available memory on the robot 102. As the robot 102 explores the environment, the total number of detected targets and their corresponding states vary, as new targets can appear in the FoV of the robot 102 and existing targets can disappear. An observation set 310 obtained by the robot 102 at a particular time includes measurements that are associated with actual targets and measurements arising from clutter (e.g., objects that are not targets) within the environment. The objective of multi-target tracking as performed by the system 100 is to jointly estimate, at each time step, the total number of targets and the states of each respective target from a series of noisy and cluttered observation sets 310 captured by each respective robot 102. The concept of a random finite set (RFS) is useful for formulating this problem, since within the FoV of a robot 102, the total number of targets and their corresponding states are time-varying and not completely known. An RFS is a set with a random number of elements which are themselves random. In other words, an RFS is a random variable whose possible values are unordered finite sets. A computationally tractable approach to set-based estimation is to utilize the first statistical moment of an RFS, known as the Probability Hypothesis Density (PHD) or its intensity function, for multi-target tracking. The system 100 uses the Gaussian Mixture formulation of the PHD filter (GM-PHD) for each respective robot 102, as it is less computationally expensive than the particle filter implementation.

Figure 1B:
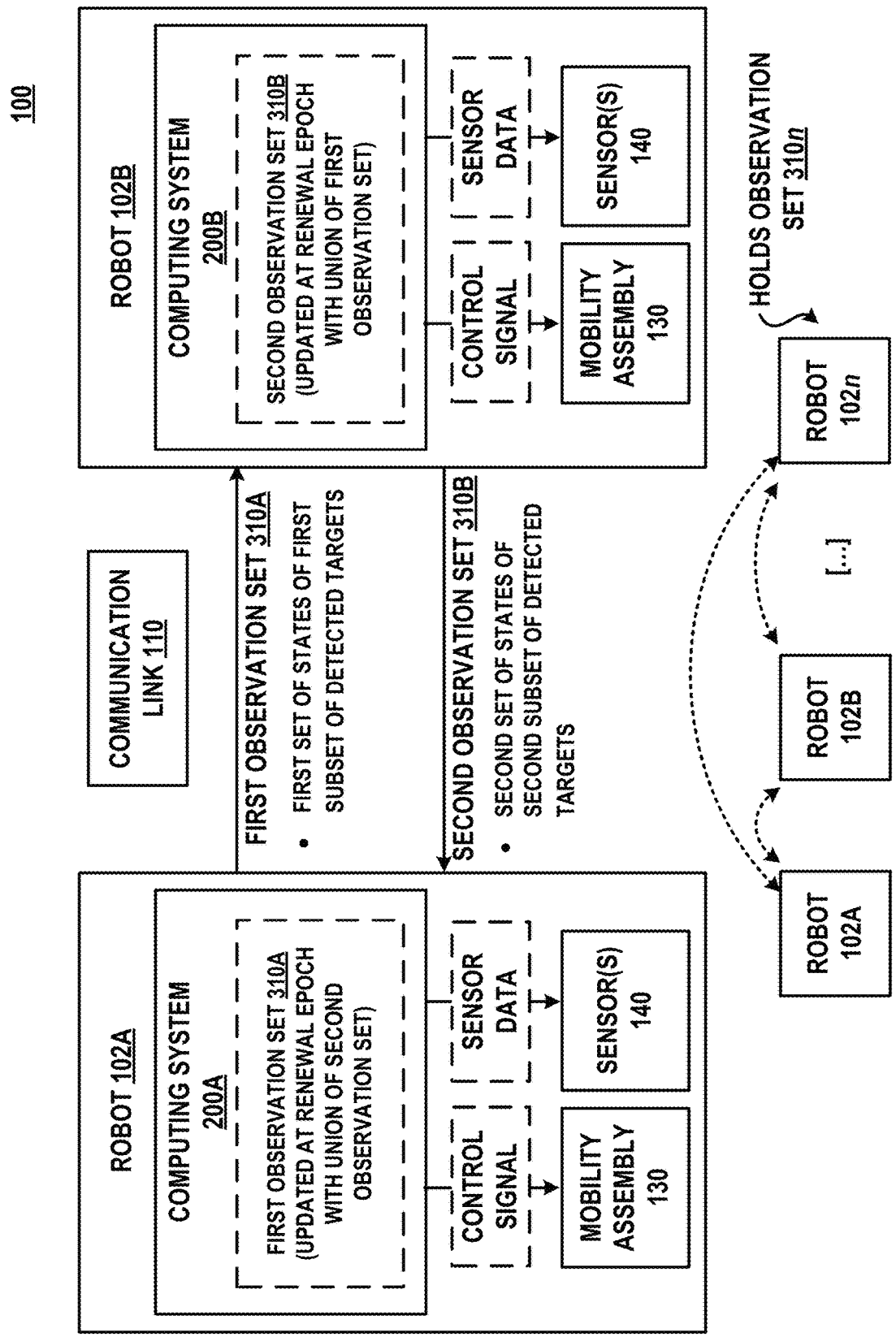
Figure 1C:
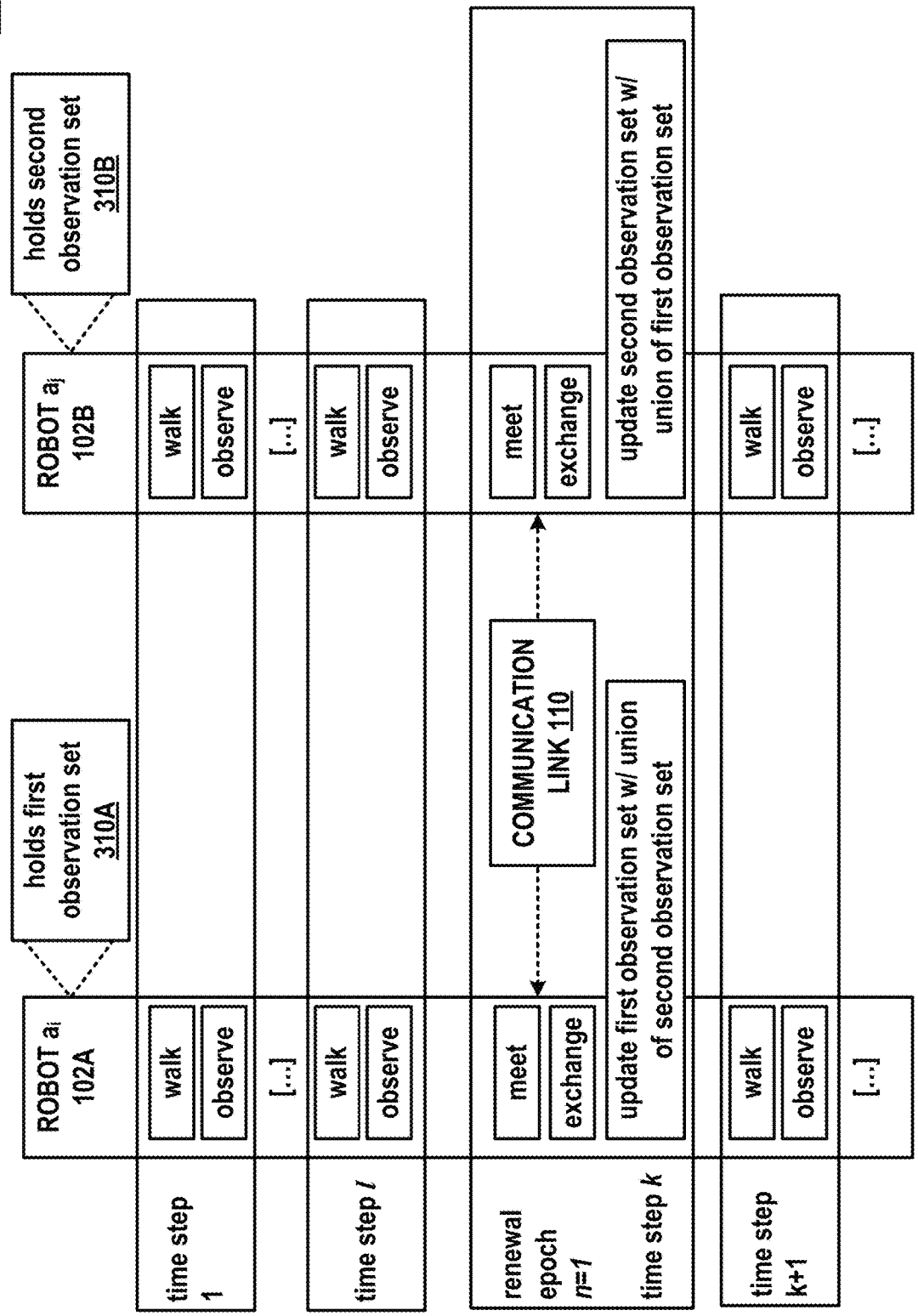

FIGS. 1A-1C illustrate the multi-target tracking approach of the system 100 with a first robot 102A, a second robot 102B and six stationary targets. As shown, the system 100 can include n total robots 102A . . . 102n; however, the first robot 102A and the second robot 102B are discussed herein for illustration purposes. The first robot 102A and the second robot 102B each explore an environment 10 (represented as a grid) according to the random walk motion model defined herein, and the first robot 102A and the second robot 102B each estimate the total number of targets and the position of each respective target within a limited sensing FoV (of each respective robot 102) using the GM-PHD filter described herein. Sample trajectories are shown for the first robot 102A and the second robot 102B as a sequence of arrows that indicate its direction of motion along the environment 10. At time step k, the first renewal epoch, the first robot 102A and the second robot 102B meet at node m and exchange rewards (e.g., information about an observation set 310 collected by each respective robot 102, formulated as a renewal-reward process) over a communication link 110, where the reward for each respective robot 102 can be defined as an estimate of the total number of targets that the robot has detected up until time k and the position of each target detected by the robot, as described herein. The communication link 110 is locally established, meaning that the first robot 102A and the second robot 102B can only communicate with one another by the communication link 110 if the first robot 102A and the second robot 102B are in close proximity to one another and essentially occupy the same relative position within the environment 10. The implementation of this strategy is described in pseudocode in Algorithm 1 and Algorithm 2. The system 100 extracts only unique target states during simulation using set union methods, as described in Algorithm 3.

Each respective robot 102 includes a computing system 200 including a processor 220 and a memory 240 (FIG. 10) that collectively enable each respective robot 102 to move within the environment 10, collect observations about a plurality of targets 12 present in the environment, and communicate with other robots 102 to come to a consensus on the quantity and locations of targets 12 within the environment. For instance, the first robot 102A includes a first computing system 200A and the second robot 102B includes a second computing system 200B. Each respective robot 102 includes a mobility assembly 130 that receives control signals from the associated computing system 200 of the robot 102. Depending on the application, the mobility assembly 130 and internal control input determination implemented by the computing system 200 can vary based on the structure of the robot 102; for example, if the robot 102 is a quadrotor, then the mobility assembly 130 includes a rotor assembly. Each respective robot 102 further includes one or more sensors 140 that provide sensor data to the computing system 200, enabling each robot 102 to collect observations about the environment 10. In one example implementation, one or more sensors 140 may include a camera operable to capture images of a field-of-view (FoV) of the robot 102; these images can be used to detect targets 12 within the environment and collect information about a state of each respective target 12, which can include location (as determined by location information of the robot 102 and a position of a target 12 within the FoV of the robot 102), an assigned label, a size, a color, etc. With respect to the present disclosure, the plurality of targets 12 are literal objects within the environment 10 and include one or more subsets of detected target items 20 recognized by each respective robot 102, which can vary between observation sets 310 held by each respective robot 102. For instance, the first robot 102A can observe a first subset of detected target items 20A of the plurality of targets 12 within the environment, the second robot 102B can observe a second subset of detected target items 20B of the plurality of targets 12 within the environment, and the $n^{th}$ robot 102n can observe an $n^{th}$ subset of detected target items 20n of the plurality of targets 12 within the environment.

Each respective robot 102 holds the observation set 310 within their respective memories 240; each observation set 310 can include representations of a subset of detected target items 20 including a set of detected target representations (where each detected target representation is representative of a detected target item of the subset of detected target items 20) and a set of detected target states (for each detected target representation of the subset of detected target representations). The observation set 310 can include a local estimate value of a total quantity of detected target items 20 observed by the robot 102. Each respective robot 102 obtains the observation set 310 through sensor data obtained by the one or more sensors 140; in particular, each respective robot 102 applies the GM-PHD filter to the sensor data to obtain the observation set 310.

For instance, the first robot 102A, observing the first subset of detected target items 20A, can hold and update a first observation set 310A including a first set of detected target representations, where each detected target representation is representative of a respective detected target of the first subset of detected target items 20A. The first observation set 310A can include a first set of detected target states, where each detected target state is associated with a detected target representation of the first set of detected target representations. In short, the first observation set 310A includes information indicative of the first subset of detected target objects 20A physically observed by the first robot 102A at a given time step. Similarly, the second robot 102B, observing the second subset of detected target items 20B, can hold and update a second observation set 310B including a second set of detected target representations and a second set of detected target states, where each detected target representation is representative of a respective detected target of the second subset of detected target items 20B. Generically, the $n^{th}$ robot 102n, observing an $n^{th}$ subset of detected target items 20n, can hold and update an $n^{th}$ observation set 310n including an $n^{th}$ set of detected target representations and an $n^{th}$ set of detected target states, where each detected target representation is representative of a respective detected target of the $n^{th}$ subset of detected target items 20n and where the $n^{th}$ subset of detected target items 20n_is a subset of the plurality of target items 12 within the environment 10.

At each renewal epoch, each robot 102 exchanges information indicative of the observation set 310 held by the respective robot 102 at that point. For instance, if the first robot 102A and the second robot 102B meet at a renewal epoch, then the first robot 102A transmits information indicative of the first observation set 310A to the second robot 102B over the communication link 110 and receives information indicative of the second observation set 310B from the second robot 102B; the second robot 102B transmits information indicative of the second observation set 310B to the first robot 102A over the communication link 110 and receives information indicative of the first observation set 310A from the first robot 102A. The first robot 102A updates the first observation set 310A with a union operation to combine the first observation set 310A with the second observation set 310B. Similarly, the second robot 102B updates the second observation set 310B with a union operation to combine the second observation set 310B with the first observation set 310A.

This process is iteratively repeated until each robot 102 has had the chance to meet up with other robots 102 and exchange information. In some embodiments, local estimated values of a quantity of detected target items held by each respective robot 102 can be obtained by determining a cardinality of the set of detected target representations within the observation set 310 (e.g., by determining how many elements are present within the set of detected target representations).

Discrete-Time Discrete-Space (DTDS) Markov Chain Model of Robot Motion

Let $Y_k^{a_i} \in S$ be a random variable that represents the location of robot ($a_i$) (e.g., robot 102, which can include the first robot 102A, the second robot 102B, . . . , or the nth robot 102n), at time k on the spatial grid. For each respective robot ($a_i$), a probability mass function $\pi_k \in \mathbb{R}^{1 \times S}$ of $Y_k^{a_i}$ evolves according to a discrete-time discrete-space (DTDS) Markov chain given by:

$$\pi_{k+1} = P\pi_k, \quad (1)$$

where the state transition matrix $P \in \mathbb{R}^{S \times S}$ has elements $p_{ij} \in [0,1]$ at row i and column j. The time evolution of the probability mass function of $Y_k^{a_i}$ is expressed using the Markov property as follows:

$$Pr(Y_{k+1}^{a_i} = j_{k+1} | Y_k^{a_i} = j_k, \ldots, Y_0^{a_i} = j_0) = Pr(Y_{k+1}^{a_i} = j_{k+1} | Y_k^{a_i} = j_k), \quad (2)$$

---

Algorithm 1: Control strategy for robot $a_i \in \mathcal{N}$

---

Step 0: Initialization
$a_i, J_\gamma^{(a_i)}, \mu_\gamma^{(a_i)}, P_\gamma^{(a_i)}, Y_0^{(a_i)}, F_{k-1}, Q_{k-1}, H_k, R_k, K_0^{(a_i)}(z), p_S, p_D, w_0^{(a_i)}, M_0^{(\cdot)}$
Step 1: Random Walk
$[Y_k^{(a_i)}]$ = MarkovRandomWalk $(Y_{k-1}^{(a_i)})$;
Step 2: GM-PHD Filter
a Predicted State Components
$J_{k-1}^{(a_i)} = J_\gamma^{(a_i)}; w_{k-1}^{(a_i)} = w_\gamma^{(a_i)}; \mu_{k-1}^{(a_i)} = \mu_\gamma^{(a_i)}$
$\lfloor w_{k|k-1}^{(a_i)}, \mu_{k|k-1}^{(a_i)}, P_{k|k-1}^{(a_i)}, J_{k|k-1}^{(a_i)} \rfloor$ = predictGMPHD
$(J_{k-1}, w_{k-1}^{(a_i)}, \mu_{k-1}^{(a_i)}, P_{k-1}^{(a_i)}, F_{k-1}, Q_{k-1}, P_S)$;
b Updated State Components
$\lfloor w_k, \mu_k, P_k, J_k \rfloor$
  = updateGMPHD $(H_k, \mu_{k|k-1}, R_k, P_{k|k-1}, p_D, J_{k|k-1}, w_{k|k-1}, K_k^{(a_i)}(z), Z_k^{(a_i)})$
c Pruning and Merging Components
d Multi-target State Extraction
  $\text{thresh}_{state} = 0.5$
$\lfloor \hat{X}_k^{(a_i)}, \hat{w}_k^{(a_i)}, \hat{P}_k^{(a_i)} \rfloor$ = extractMTStateGMPHD $(w_k^{(a_i)}, \mu_k^{(a_i)}, P_k^{(a_i)}, \text{thresh}_{state})$;
$\mathcal{M}_k^{(a_i)} = \mathcal{M}_{k-1}^{(a_i)} \cup \hat{X}_k^{(a_i)}$;

--- where $j_k$ is a specific node in the spatial grid that the robot 102 may occupy at time k. In other words, Eq. (2) states that a future location of the robot 102 depends only on a current location of the robot 102 and is statistically independent of any previous locations. Assuming that the DTDS Markov chain is time-homogeneous, it can be said that $Pr(Y_{k+1}^{a_i} = j_{k+1} | Y_k^{a_i} = j_k)$ is same for all robots 102 at all time steps. Thus, the entries of P can be defined as follows:

$$p_{ij} = Pr(Y_{k+1}^{a_i} = j_{k+1} | Y_k^{a_i} = j_k), \forall j_k \in S, k \in \mathbb{Z} \geq 0, a_i \in \mathcal{N} \quad (3)$$

Assuming that each robot 102 selects its next position from a uniform random distribution, the system 100 can compute the entries of P as follows:

$$P_{ij} = \begin{cases} \dfrac{1}{d_i + 1}, & (i, j) \in \mathcal{E}_S, \\ 0, & \text{otherwise} \end{cases} \quad (4)$$

where $d_i$ is the degree of the node $i \in S$. Since each entry $p_{ij} \geq 0$, one can use the notation $P \geq 0$. Because $P^m \geq 0$ for $m \geq 1$, P is a non-negative matrix. Then, it can be shown that P is a stochastic matrix. Equation 1 is defined as the spatial Markov chain. From the construction of the spatial Markov chain, every robot 102 has a positive probability of moving from node $i \in S$ to any node $j \in S$ in a finite number of time steps. Thus, the Markov chain is said to be irreducible, and consequently, P is an irreducible matrix. It can be shown that there exists a real unique positive left eigenvector of P. Since P is a stochastic matrix, $\rho(P)=1$, where $\rho(P)$ denotes the spectral radius of P. Thus, one can conclude that this real unique positive left eigenvector is the stationary distribution associated with the spatial Markov chain. Since it has been shown that the Markov chain is irreducible and has a stationary distribution $\pi$ that satisfies $\pi P = \pi$, one can conclude that the Markov chain is positive recurrent. Thus, all states in the Markov chain are positive recurrent, which implies that each robot 102 of the system 100 will keep visiting every state on the finite spatial grid infinitely often. This result is used to prove results on the associated renewal-reward process, which is discussed next.

Renewal-Reward Process

Consider a random variable $\tau_j^{a_i} \in \mathbb{R} \geq 0$ as the $j^{th}$ interval between two successive times at which robot $a_i$ (e.g., robot 102, which can include the first robot 102A, the second robot 102B, . . . , or the $n^{th}$ robot 102n) and any another robot 102 of the system 100 occupy the same node. This time interval is referred to as the inter-arrival time. A renewal epoch is a time instant at which two robots 102 of the system 100 meet at the same node of the environment. For each robot $a_i$, the counting process $T^{a_i}(k) \in \mathbb{Z} \geq 0$ is defined as the number of times robot $a_i$ has met any other robot 102 by time k. At each renewal epoch, robot $a_i$ updates its reward (defined as the number of all detected targets and their locations) with the number of targets and locations detected by other robot(s) 102 that also occupy the current node and transmit this information to robot $a_i$. If the sequence of non-negative random variables $\{\tau_0^{a_i}, \tau_1^{a_i}, \ldots, \}$ is independent and identically distributed, then the counting process $T^{a_i}(k)$ is said to be a renewal process. The end of this section of the present disclosure demonstrates that $T^{a_i}(k)$ is a renewal process.

For a renewal process having inter-arrival times $\tau_0^{a_i}$, $\tau_1^{a_i}, \ldots, S_n^{a_i} = \sum_{j=1}^{n} \tau_j^{a_i}$ is defined as the $n^{th}$ renewal epoch, with $S_0^{a_i} = 0$ for all $a_i \in \mathcal{N}$. From the definition of a renewal process, it can be inferred that the number of renewal epochs by time k is greater than or equal to n if and only if the $n^{th}$ renewal epoch occurs before or at time k; that is, $$T^{a_i}(k) \geq n \Leftrightarrow S_n^{a_i} \leq k \quad (5)$$

Now consider that at each renewal epoch, robot $a_i$ receives a reward. The reward $R_n^{a_i}$ earned by robot $a_i$ when the $n^{th}$ renewal epoch occurs (when the robot $a_i$ (e.g., the first robot 102A) meets another robot $a_j$ (e.g., the second robot 102B) at time k) is defined as follows:

$$R_n^{a_i} \mathcal{M}_k^{a_i} \bigcup_{a_j \neq a_i} \mathcal{M}_k^{a_j}, Y_k^{a_j} = Y_k^{a_i} \text{ and } a_j \in \mathcal{N} \quad (6)$$

Equation 5 and Equation 6 together define a renewal-reward process. Each robot $a_i$ calculates $\mathcal{M}_k^{a_i}$ by estimating the number of targets and their spatial distribution using a PHD filter. The present disclosure describes some fundamental theory on target detection and tracking using this type of filter.

Given the robot motion model defined herein, the dynamics of movement of the plurality of robots 102 on the spatial grid can be defined by a composite Markov chain with states $\psi_k = (Y_k^{a_1}, Y_k^{a_2}, \ldots, Y_k^{a_N}) \in \mathcal{H}$, where $\mathcal{H} = \mathcal{S}^N$. Note that $S = |S|$ and $[\mathcal{H}] = S^N$. The present disclosure now defines another undirected graph $\hat{\mathcal{G}} = (\hat{\mathcal{V}}, \hat{\varepsilon})$ associated with this composite Markov chain. The vertex set $\hat{\mathcal{V}}$ is a set of all possible realizations $\hat{i} \in \mathcal{H}$ of $\psi_k$. Here $\hat{i}(a_l)$ represents the $a_l^{th}$ entry of $\hat{i}$, which corresponds to the spatial node $i \in S$ occupied by robot $a_l \in \mathcal{N}$ and $l \in I$. The edge set $\hat{\varepsilon}$ of graph $\hat{\mathcal{G}}$ is defined as follows: $(\hat{i}, \hat{j}) \in \hat{\varepsilon}$ if and only if $(\hat{i}(a_l), \hat{j}(a_l)) \in \varepsilon_S$ for all robots $a_l \in N$. Let $Q \in \mathbb{R}^{|\mathcal{H}| \times |\mathcal{H}|}$ be the state transition matrix associated with this composite Markov chain. An element of Q, denoted by $q_{ij}$, is the probability that in the next time step, each robot a will move from spatial node $\hat{i}(a_l)$ to node $\hat{j}(a_l)$. These elements are computed from the transition probabilities defined by Equation (4) as follows:

$$q_{\hat{i}\hat{j}} = \prod_{a_l=1}^{N} p_{\hat{i}(a_l)\hat{j}(a_l)}, \forall \hat{i}, \hat{j} \in \mathcal{H} \text{ and } l \in I. \quad (7)$$

Figure 2:
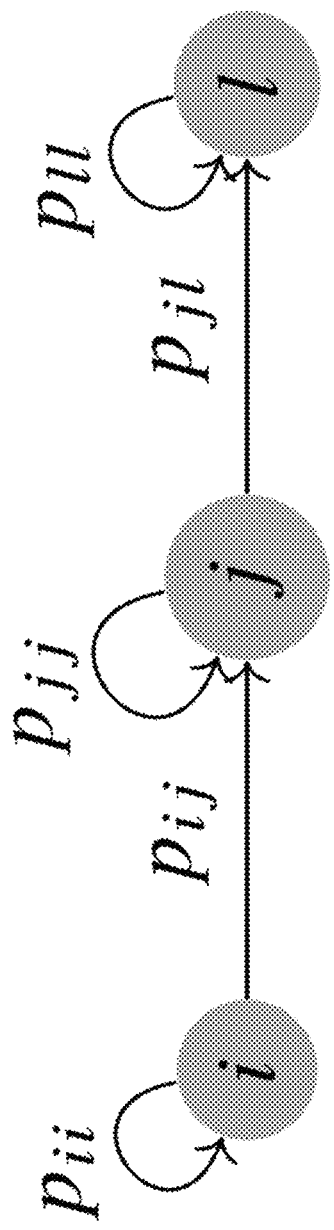
FIG. 2 is an illustration of an example graph defined on a set of spatial nodes in which the arrows signify directed edges between pairs of distinct nodes or self-edges.
Figure 3:
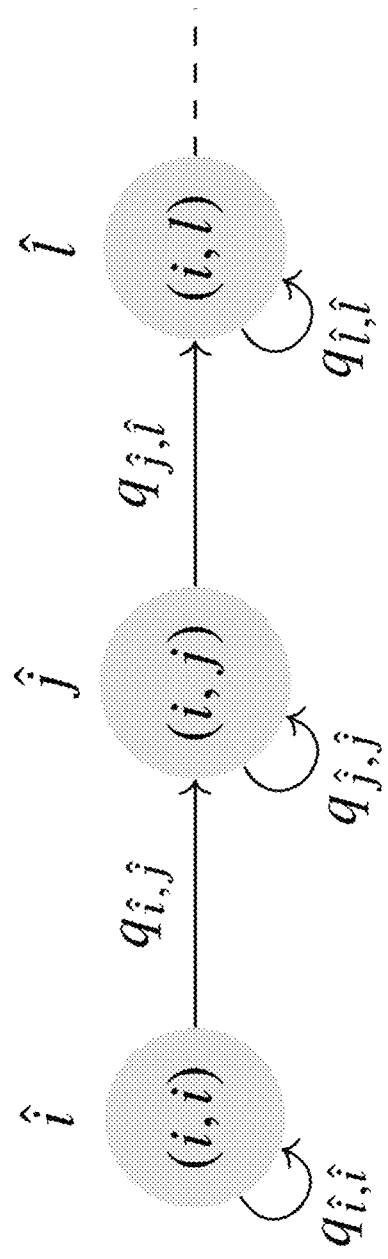
FIG. 3 is an illustration showing a subset of a composite graph for two agents that move on the graph shown in FIG. 2.

As an illustration, consider a set of two robots, $\mathcal{N} = \{a_1, a_2\}$ (e.g. where $a_1$ is the first robot 102A and $a_2$ is the second robot 102B), that move on the graph $\mathcal{G}_S$ represented in FIG. 2. The first robot 102A and the second robot 102B can stay at their current node in the next time step or travel between nodes i and j and between nodes j and l, but they cannot travel between nodes i and l. FIG. 3 shows a subset of the resulting composite graph $\hat{\mathcal{G}}$, which has the set of nodes $\hat{\mathcal{V}} = (i,i)(i,j)(i,l)(j,i)(j,j)(j,l)(l,i)(l,j)(l,l)$. Each node in $\hat{\mathcal{V}}$ is labeled by a single index $\hat{i}$, e.g., $\hat{i} = (i,j)$, with $\hat{i}(a_1) = i$ and $\hat{i}(a_2) = j$. Given the connectivity of the spatial grid defined by $\varepsilon_S$, $((i,j),(i,l))$ is an edge in $\hat{\varepsilon}$, for example, but not $((i,j),(l,l))$. Since N=2 and S=3, $|\mathcal{H}| = 3^2 = 9$. For each $\hat{i}, \hat{j} \in \hat{\mathcal{V}}$, the transition probabilities in $Q \in \mathbb{R}^{9 \times 9}$ are computed from Equation (7) as follows:

$$q_{\hat{i}\hat{j}} = Pr(\psi_{k+1} = \hat{j} | \psi_k = \hat{i}) = p_{\hat{i}(a_1)\hat{j}(a_1)} p_{\hat{i}(a_2)\hat{j}(a_2)}, k \in \mathbb{Z}_+ \quad (8)$$

It can now be proven that $T^{a_i}(k)$ is a renewal process.

Theorem IV.1. $T^{a_i}(k)$ is a renewal process on the composite Markov chain $\psi_k$.

Proof. Suppose that an initial time instant $k_0$, the locations of all N robots on the spatial grid are represented by the node $\hat{i} \in \hat{\mathcal{V}}$. Consider another set of robot locations at time $k_0 + k$, where k>0, represented by the node $\hat{j} \in \hat{\mathcal{V}}$. The transition of the robots from configuration $\hat{i}$ to configuration $\hat{j}$ in k time steps corresponds to a random walk of length k on the composite Markov chain $\psi_k$ from node $\hat{i}$ to node $\hat{j}$. It also corresponds to a random walk by each robot $a_i$ on the spatial grid from node $\hat{i}(a_i)$ to node $\hat{j}(a_i)$ in k time steps. By construction, the graph $\mathcal{G}_S$ is strongly connected and each of its nodes has a self-edge. Therefore, there exists a discrete time n>0 such that, for each robot $a_i \in \mathcal{N}$, there exists a random walk on the spatial grid from node $\hat{i}(a_i)$ to node $\hat{j}(a_i)$ in n time steps. Consequently, there always exists a random walk of length n on the composite Markov chain $\psi_k$ from node $\hat{i}$ to node $\hat{j}$. Therefore, $\psi_k$ is an irreducible Markov chain. All states of an irreducible Markov chain belong to a single communication class. In this case, all states are positive recurrent. As a result, $\psi_k$ is positive recurrent. Thus, each state in $\psi_k$ is visited infinitely often from all other states in $\psi_k$. A state with this property is said to regenerate (or renew) infinitely often. It can then be concluded that $T^{a_i}(k)$ is a regenerative process on $\psi_k$. Since every regenerative process is a renewal process, $T^{a_i}(k)$ is a renewal process.

---

Algorithm 2: Renewal-reward computation for robots $(a_i, a_j) \in \mathcal{N}$

Given: $\mathcal{M}_k^{(a_i)}, \mathcal{M}_k^{(a_j)}, Y_k^{(a_i)}, Y_k^{(a_j)}$
for $k \in 1 = t_{final}$ do
  $l = 1; n = 1;$
  for $n_2 \in n_1 + 1 : |\mathcal{N}|$ do
    if $Y_k^{(n_1)} = Y_k^{(n_2)}$ then
      $R_n^l = \mathcal{M}_k^{(n_1)} \cup \mathcal{M}_k^{(n_2)};$
      $l = l + 1; n = n + 1;$
    end
  end
end

---

Algorithm 3: Exchange of set of estimated states between robots

Given: $X_{k-1}^{(a_i, a_j)}, \hat{X}_k^{(a_i)}, \hat{X}_k^{(a_j)}$
for $l_1 \in 1 : \text{size}(|\hat{X}_k^{(a_i)}|, 2)$ do
  for $l_2 \in 1 : \text{size}(|\hat{X}_k^{(a_j)}|, 2)$ do
    $X_{temp} = \hat{X}_{k,l_1}^{(a_i)} \cup \hat{X}_{k,l_2}^{(a_j)}$
    if $X_{temp} \not\subset X_{k-1}^{(a_i, a_j)}$ then
      $X_k^{(a_i, a_j)} = X_{k-1}^{(a_i, a_j)} \cup X_{temp};$
    end
    else
      $X_k^{(a_i, a_j)} = X_{k-1}^{(a_i, a_j)};$
    end
  end
  $\mathcal{M}_k^{(a_i, a_j)} = X_k^{(a_i, a_j)}$
end

---

Random Finite Sets Based Probability Hypothesis Density Filter

Let $\mathcal{M}_k^{a_i} \leq n_m$ be the number of targets identified by robot $a_i$ (e.g., the first robot 102A) at time step k, where the first robot 102A holds this information in the first observation set 310A. Suppose that at time k−1, the target states are $$x_{k-1,1}^{a_i}, x_{k-1,2}^{a_i}, \ldots, x_{k-1,\mathcal{M}_{k-1}^{a_i}}^{a_i}$$

where X is the set of target states. At the next time step, some of these targets might disappear from the field of view (FoV) of the first robot 102A, and new targets may appear. This results in $\mathcal{M}_k^{a_i}$ new states $$x_{k,1}^{a_i}, x_{k,2}^{a_i}, \ldots, x_{k,\mathcal{M}_k^{a_i}}^{a_i}.$$

Note that the order in which the states are represented has no significance in the RFS multi-target tracking formulation. The robot $a_i$ (e.g., the first robot 102A) makes $N_k^{a_i}$ measurements $$\mathcal{Z}_{k,1}^{a_i}, \ldots, \mathcal{Z}_{k,N_k^{a_i}}^{a_i} \in \mathcal{Z}$$

at time k, where $\mathcal{Z}$ is the set of measurements. The order in which the measurements are made is not significant. The states of the targets identified by robot $a_i$ (e.g., the first robot 102A) at time k (i.e., the multi-target state) and the measurements obtained by the first robot 102A at time k can both be represented as finite sets, and stored as the first observation set 310A by the first robot 102A (e.g., within the memory 240 of the first robot 102A):

$$X_k^{a_i} = \{x_{k,1}^{a_i}, \ldots, x_{k,M_k^{a_i}}^{a_i}\} \tag{9}$$

$$Z_k^{a_i} = \{\mathcal{Z}_{k,1}^{a_i}, \ldots, \mathcal{Z}_{k,N_k^{a_i}}^{a_i}\} \tag{10}$$

where $\mathcal{F}(\chi)$ is the multi-target state space and $\mathcal{F}(\mathcal{Z})$ is the measurement space. For a robot $a_i$ (e.g., the first robot 102A), given multi-target state $$X_{k-1}^{a_i}$$

at time k−1, each $$x_{k-1}^{a_i} \in X_{k-1}^{a_i}$$

either continues to exist (survives) at time k with probability $$p_{S,k}^{a_i}(x_{k-1}^{a_i})$$

or disappears (dies) at time k: with probability $$1 - p_{S,k}^{a_i}(x_{k-1}^{a_i}).$$

The conditional probability density at time k: of a transition from state $x_{k-1}^{a_i}$ to state $x_k^{a_i}$ is given by $$f_{k|k-1}^{a_i}(\cdot \mid \cdot).$$

The present disclosure defines the RFS model for the time evolution of the multi-target state held as an observation set 310 within the memory 240 of the robot 102, which incorporates motion of the targets relative to the robot 102, appearance (birth) of targets, and disappearance (death) of targets:

$$X_k^{a_i} = \left[\bigcup_{\xi \in X_{k-1}^{a_i}} S_{k|k-1}^{a_i}(\xi)\right] \cup \left[\bigcup_{\xi \in X_{k-1}^{a_i}} B_{k|k-1}^{a_i}(\xi)\right] \cup \Gamma_k^{a_i} \tag{11}$$

$S_{k|k-1}^{a_i}(\xi)$; RFS of targets with previous state $\xi$ at time k−1 that survive at time k $B_{k|k-1}^{a_i}(\xi)$; RFS of targets spawned at time k from targets with previous state $\xi$ at time k−1

$\Gamma_k^{a_i}$; RFS of targets that are spontaneously born at time k

At each time step, the robot $a_i$ (e.g., the first robot 102A) detects a target with state $x_k^{a_i} \in X_k^{a_i}$ with probability $p_{D,k}^{a_i}(\cdot)$, or misses it with probability $1 - p_{D,k}^{a_i}(\cdot)$. The conditional probability of obtaining a measurement $z_k^{a_i} \in Z_k^{a_i}$ from $x_k^{a_i}$ is characterized by the multi-target likelihood function, $g_k^{a_i}(\cdot|\cdot)$. The RFS model is now defined for the time evolution of the multi-target measurement, which incorporates measurements of actual targets into the observation set 310 held within the memory 240 of the robot 102 along with clutter:

$$Z_k^{a_i} = K_k^{a_i} \cup \left[\bigcup_{x \in X_k^{a_i}} \Theta_k^{a_i}(x)\right] \tag{12}$$

$K_k^{a_i}$; RFS of measurements arising from clutter at time k $\Theta_k^{a_i}(x)$ RFS of measurements of the multi-target state $X_k^{a_i}$ at time k The multi-target Bayes filter propagates the multi-target posterior density $p_k^{a_i}(\cdot|Z_{1:k}^{a_i})$ in time via recursion as:

$$p_{k|k-1}^{a_i}(X_k^{a_i} \mid Z_{1:k-1}^{a_i}) = \int_{X^{a_i} \in \mathcal{F}(\chi)} f_{k|k-1}^{a_i}(X_k^{a_i} \mid X^{a_i}) p_{k-1}^{a_i}(X^{a_i} \mid Z_{1:k-1}^{a_i}) \mu_s(dX^{a_i}) \tag{13}$$

$$p_k^{a_i}(X_k^{a_i} \mid Z_{1:k}^{a_i}) = \frac{g_k^{a_i}(Z_k^{a_i} \mid X_k^{a_i}) p_{k-1}^{a_i}(X_k^{a_i} \mid Z_{1:k-1}^{a_i})}{\int_{X^{a_i} \in \mathcal{F}(\chi)} gk(Z_k^{a_i} \mid X^{a_i}) p_{k|k-1}^{a_i}(X^{a_i} \mid Z_{1:k-1}^{a_i}) \mu_S(dX^{a_i})} \tag{14}$$

where $\mu_s$ is a suitable reference measure on $\mathcal{F}(\chi)$ of target states $X^{a_i} \in \mathcal{F}(\chi), g_k^{a_i}(\cdot|\cdot)$ represents the multi-target likelihood function, and $f_{k|k-1}^{a_i}(\cdot|\cdot)$ represents the multi-target transition density.

The integrals above can be approximated using the framework of the probability hypothesis density (PHD) filter, with the assumptions that: (1) each target evolves and generates observations independently of the others; (2) clutter is Poisson distributed and independent of target-originated measurements; (3) the multi-target RFS is Poisson distributed. For a RFS $X^{a_i} \in \chi$ with probability distribution $p^{a_i}(\cdot)$, there is a non-negative function $v$ on $\chi$, defined as the intensity function, such that for each region $S \subset \chi$, $$\int |X^{a_i} \cap S| p^{a_i}(dX) = \int_S v(x) dx \tag{15}$$

Then the posterior intensity and its recursion can be modeled as follows:

$$v_{k|k-1}^{a_i}(x) = \tag{16}$$

$$\int p_{S,k}^{a_i}(\xi) f_{k|k-1}^{a_i}(x \mid \xi) v_{k-1}^{a_i}(\xi) d\xi + \int \beta_{k|k-1}^{a_i}(x \mid \xi) v_{k-1}^{a_i}(\xi) d\xi + \gamma_k^{a_i}(x)$$

-continued $$v_k^{a_i}(x) = [1 - p_{D,k}^{a_i}(x)]v_{k|k-1}^{a_i}(x) + \sum_{z \in Z_k^{a_i}} \frac{p_{D,k}^{a_i}(x)g_k^{a_i}(z|x)v_{k|k-1}^{a_i}(x)}{K_k^{a_i}(z) + \int p_{D,k}^{a_i}(\xi)g_k^{a_i}(z|\xi)v_{k|k-1}^{a_i}(\xi)} \quad (17)$$

In these equations, $v_k^{a_i}$ and $v_{k|k-1}^{a_i}$ denote the intensities associated with, respectively, the multi-target posterior density $p_k^{a_i}(\cdot|\cdot)$ and the multi-target predicted density $p_{k|k-1}^{a_i}(\cdot|\cdot)$ that are defined by the recursion in Equation 13 and Equation 14. The function $\gamma_k^{a_i}(\cdot)$ is the intensity of the RFS $\Gamma_k^{a_i}$, $\beta_{k|k-1}^{a_i}(\cdot|\xi)$ is the intensity of the RFS $B_{k|k-1}(\xi)$, and $K_k^{a_i}(\cdot)$ is the intensity of the RFS $K_k^{a_i}$. The robot $a_i$ (e.g., the robot 102) can estimate the number of targets as:

$$\hat{N} = \int v(x) dx. \quad (18)$$

The estimate $\hat{N}$ is used to update the number of elements of $\mathcal{M}_k^{a_i}$, and the intensity $v_k^{a_i}(x)$ computed from Equation 17 is used to update the states of the $\hat{N}$ targets. Then each element of $\mathcal{M}_k^{a_i}$ is represented as the following tuple:

$$m_k^{a_i} = \langle l, v_k^{a_i}(x) \rangle. \quad (19)$$

where l is a label for the tracked target, such as one of its properties, e.g. its color, shape, size, or its position in the environment. This information can be included within the observation set 310 held by the robot 102. Note that each individual robot 102 iteratively holds and updates its own observation set 310 in this manner; for instance, the first robot 102A iteratively holds and updates the first observation set 310A, the second robot 102B iteratively holds and updates the second observation set 310B and an $n^{th}$ robot 102n also iteratively holds and updates an nth observation set 310n in the same manner.

Gaussian Mixture PHD Filter

The PHD filter does not admit a closed-form solution in general, and the numerical integration suffers from the curse of dimensionality. Thus, for implementation purposes, a solution of the PHD filter is considered that models approximates it as a mixture of Gaussians. The Gaussian Mixture PHD (GM-PHD) filter provides a closed-form solution to the PHD filter implemented by each respective robot 102 (e.g., the first robot 102A, the second robot 102B, ... the $n^{th}$ robot 102n) under the following assumptions:

A.1 Each target generates observations independently of the others.
A.2 The clutter process is Poisson distributed and is independent of target-generated measurements.
A.3 Each target's state evolves according to a linear model with Gaussian process noise, and each robot's sensor has a linear measurement model with Gaussian sensor noise, i.e.

$$f_{k|k-1}^{a_i}(x|\xi) = \mathbb{N}(x; F_{k-1}, Q_{k-1}). \quad (20)$$

$$g_k^{a_i}(z|\xi) = \mathbb{N}(z; H_k x, R_k). \quad (21)$$

where the notation $\mathbb{N}(\cdot; \mu, \sigma)$ denotes a Gaussian density with mean $\mu$ and covariance $\sigma$, $F_{k-1}$ is the state transition matrix, $Q_{k-1}$ is the process noise covariance, $H_k$ is the observation or measurement matrix, and $R_k$ is the sensor noise covariance.

A.4 The detection probability is state-dependent and is modeled as $$p_{D,k}^{a_i}(x) = \begin{cases} p_D & \|q_k^{a_i} - x\| \in \mathcal{B}_r(q_k^{a_i}) \\ 0 & \text{otherwise}, \end{cases} \quad (22)$$

where $q_k^{a_i}$ denotes the grid coordinates of robot $a_i$ (e.g., first robot 102A) at time k and $\mathcal{B}_r(q_k^{a_i})$ represents the FoV of the sensor on robot $a_i$, which is modeled as a disc of radius r centered at the location $q_k^{a_i}$ of the robot $a_i$. The survival probability is assumed to be constant:

$$p_{S,k}^{a_i}(x) = p_{S,k} \quad (23)$$

A.5 The birth and spawning intensities are modeled as Gaussian mixtures of the form $$\gamma_k^{a_i}(x) = \sum_{i=1}^{J_{\gamma,k}} w_{\gamma,k}^{(i)} \mathbb{N}(x; \mu_{\gamma,k}^{(i)}, P_{\gamma,k}^{(i)}), \quad (24)$$

$$\beta_{k|k-1}^{a_i}(x|\xi) = \sum_{j=1}^{J_{\beta,k}} w_{\beta,k}^{(j)} \mathbb{N}(x; F_{\beta,k-1}^{(j)}\xi + d_{\beta,k-1}^{(j)}, Q_{\beta,k-1}^{(j)}), \quad (25)$$

where $J_{\gamma,k}, w_{\gamma,k}^{(i)}, \mu_{\gamma,k}^{(i)}$ and $P_{\gamma,k}^{(i)}$ are known parameters of the birth intensity, and $J_{\beta,k}, w_{\beta,k}^{(i)}, F_{\beta,k-1}^{(j)}, d_{\beta,k-1}^{(j)}, Q_{\beta,k-1}^{(j)}$ and $P_{\beta,k-1}^{(j)}$ are known parameters of the spawn intensity of a target with state $\xi$ at time k−1.

Using the above assumptions, Equation 16 and Equation 17 are rewritten as follows. The intensity associated with the multi-target predicted density can be approximated as a Gaussian mixture:

$$v_{k|k-1}^{a_i}(x) = v_{S,k|k-1}^{a_i}(x) + v_{\beta,k|k-1}^{a_i}(x) + \gamma_k^{a_i}(x), \quad (26)$$

where $$v_{S,k|k-1}^{a_i}(x) = p_{S,k} \sum_{i=1}^{J_{k-1}} w_{k-1}^{(i)} \mathbb{N}(x; \mu_{S,k|k-1}^{(i)}, P_{S,k|k-1}^{(i)}), \quad (27)$$

$$\mu_{S,k|k-1}^{(i)} = F_{k-1}\mu_{k-1}^{(i)}, \quad (28)$$

$$P_{S,k|k-1}^{(i)} = Q_{k-1} + F_{k-1} P_{k-1}^{(i)} F_{k-1}^T, \quad (29)$$

$$v_{\beta,k|k-1}^{a_i}(x) = \sum_{i=1}^{J_{k-1}} \sum_{l=1}^{J_{\beta,k}} w_{k-1}^{(i)} w_{\beta,k}^{(l)} \mathbb{N}(x; \mu_{\beta,k|k-1}^{(i,l)}, P_{\beta,k|k-1}^{(i,l)}), \quad (30)$$

$$\mu_{\beta,k|k-1}^{(i,l)} = F_{\beta,k-1}^{(l)} \mu_{k-1}^{(i)} + d_{\beta,k-1}^{(l)}, \quad (31)$$

$$P_{\beta,k|k-1}^{(i,l)} = Q_{\beta,k-1}^{(l)} + F_{\beta,k-1}^{(l)} P_{k-1}^{(i)} (F_{\beta,k-1}^{(l)})^T, \quad (32)$$

in which $J_{k-1}, w_{k-1}^{(i)}, \mu_{k-1}^{(i)}$, and $P_{k-1}^{(i)}$ are known parameters of the intensity function at time k−1.

Then the intensity associated with the multi-target posterior density can be approximated as a Gaussian mixture:

$$v_k^{a_i}(x) = [1 - p_{D,k}^{a_i}(x)]v_{k|k-1}^{a_i}(x) + \sum_{z \in Z_k^{a_i}} v_{D,k}^{a_i}(x; z), \quad (33)$$

$$v_{D,k}^{a_i}(x; z) = \sum_{j=1}^{J_{k|k-1}} w_k^{(j)}(z) \mathbb{N}(x; \mu_{k|k}^{(j)}(z), P_{k|k}^{(j)}), \quad (34)$$

$$w_k^{(j)}(z) = \frac{p_{D,k}^{a_i}(x)w_{k|k-1}^{(j)} \mathbb{N}(z; H_k \mu_{k|k-1}, R_k + H_k P_k H_k^T)}{K_k^{a_i}(z) + p_{D,k}^{a_i}(x) \sum_{l=1}^{J_{k|k-1}} w_{k|k-1}^{(l)} \mathbb{N}(z; H_k \mu_{k|k-1}, R_k + H_k P_k H_k^T)}, \quad (35)$$

-continued $$\mu_{k|k}^{(j)}(z) = \mu_{k|k-1}^{(j)}(z) + K_k^{(j)}(z - H_k \mu_{k|k-1}^{(j)}(z)), \quad (36)$$

$$P_{k|k}^{(j)} = [I - K_k^{(j)} H_k] P_{k|k-1}^{(j)}, \quad (37)$$

$$K_k^{(j)} = P_{k|k-1}^{(j)} H_k^T [H_k P_{k|k-1}^{(j)} H_k^T + R_k]^{-1}, \quad (38)$$

Simulation Results

Figure 4:
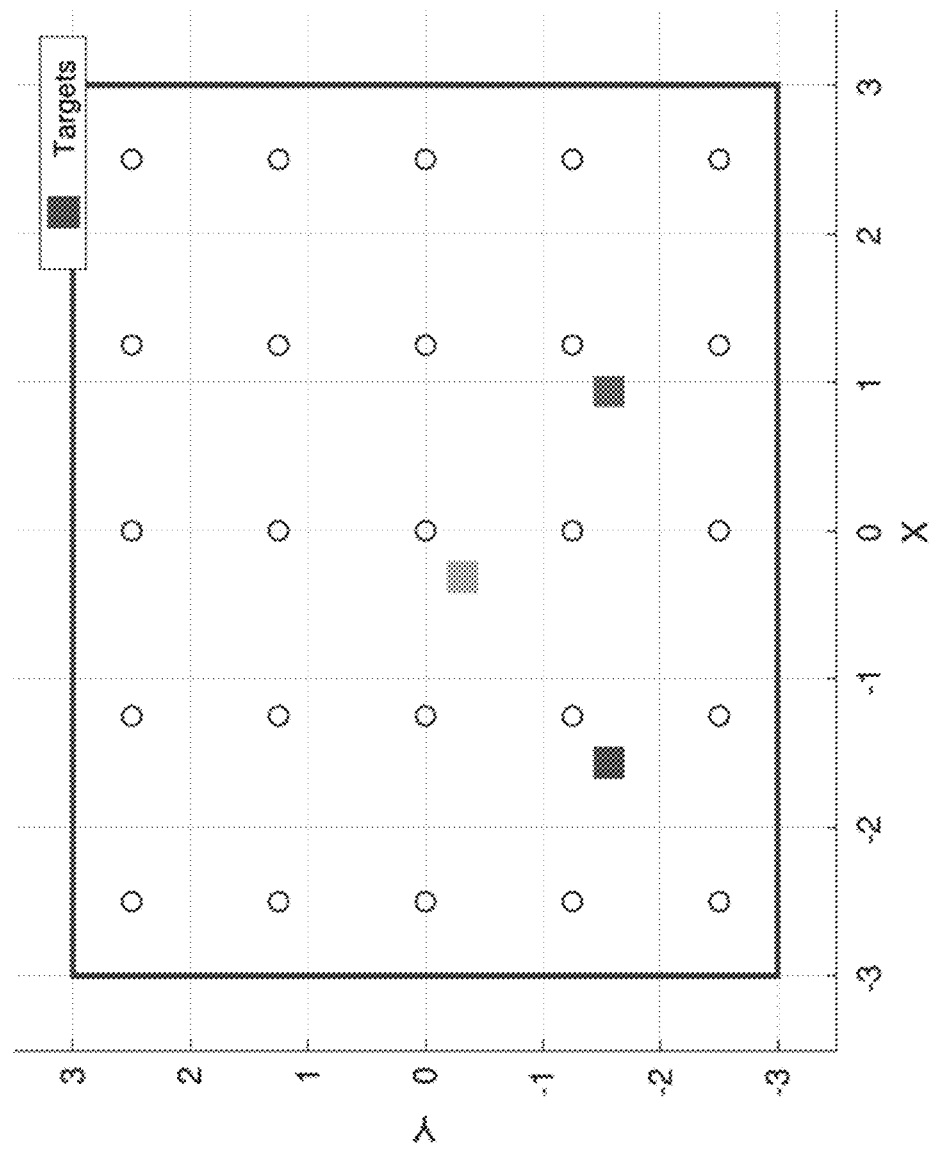
FIG. 4 is an illustration showing a 5 meter by 5 meter square environment with the hollow circles denoting the grid nodes and the squares denoting the targets in which the red border denotes the boundary of the area that is explored by three robots.

In this section, the present disclosure validates the system 100 with validation simulations in MATLAB. First, a scenario is modeled with a bounded environment with dimensions 5 m×5 m that contains 3 stationary targets which must be located by 3 robots (representing the first robot 102A, the second robot 102B, and a third robot (e.g., an $n^{th}$ robot where n=3)), as shown in FIG. 4. The state of each target is defined as its x–y position coordinates, $x = [p_x, p_y]^T$. A robot's sensor measurement of a target's state is modeled according to Equation (21). Each robot has a circular FoV of radius $r_{FOV}=0$, centered at the robot's position on the spatial grid. It is assumed that each robot is able to accurately localize itself on the grid, and that there are no obstacles present in the environment.

Since each agent has a limited FoV, the system 100 assumes that the targets that are detected at time step k survive in the next time step with probability $p_{S,k}=0.1$ for all robots. Since the targets are stationary, $F_{k-1}=I_2$, the 2×2 identity matrix. The validation simulation sets $Q_{k-1}=0.2I_2$. As the robots explore the environment, new targets might appear in their FoV. The validation simulation accounts for this by allowing 4 new targets to be birthed at each time step, depending upon the robot's position on the grid, with weights $w_{\gamma,k}=(w_{\gamma,k}^{(i)})_{i-1}^4=[0.1,0.1,0.1,0.1]^T$. Thus, the birth intensity at each time step from Equation (24) is modeled as $$\gamma_k^{a_i}(x) = 0.1\mathbb{N}(x; \mu_{\gamma,k}^{(1)}, P_{\gamma,k}^{(1)}) + \quad (39)$$
$$0.1\mathbb{N}(x; \mu_{\gamma,k}^{(2)}, P_{\gamma,k}^{(2)}) + 0.1\mathbb{N}(x; \mu_{\gamma,k}^{(3)}, P_{\gamma,k}^{(3)}) + 0.1\mathbb{N}(x; \mu_{\gamma,k}^{(4)}, P_{\gamma,k}^{(4)})$$

where $P_\gamma^{(l)} = 0.5 I_2$ and $\mu_\gamma^{(l)} = \begin{bmatrix} p_{x,k}^{a_i} + r_{birth}\cos\theta_l \\ p_{x,k}^{a_i} + r_{birth}\sin\theta_l \end{bmatrix}$ (40)

in which $q_k^{a_i}=[p_{x,k}^{a_i} p_{y,k}^{a_i}]$ denotes the x–y coordinates of robot $a_i$ at time step k, corresponding to its current node $Y_k^{a_i}$; $r_{birth}=0.8r_{FOV}$, so that the targets are birthed only near the boundary of FOV; and $\theta_l=[\pi/4, 3\pi/4, 5\pi/4, 7\pi/4]^T$ rad, the angles at which targets are likely to appear. It is assumed that there are no spawned targets. Each target is detected with a probability of $p_D=0.8$, and a robot's observation of a target follows the measurement model (21) with $H_k=I_2$ and $R_k=0.25I_2$. The observations are immersed in clutter that can be modeled as a Poisson RFS $K_k^{(\cdot)}$ with intensity $K_k^{(\cdot)}(z)=\lambda_C A_S \mathbb{U}(z)$, where $\lambda_C=3.98\times10^{-3}$ is the clutter intensity; $A_S$ is the area of the sensor's circular FoV, which is approximately 1 m²; and $\mathbb{U}(z)$ is the uniform density over $A_S$.

Figure 5A:
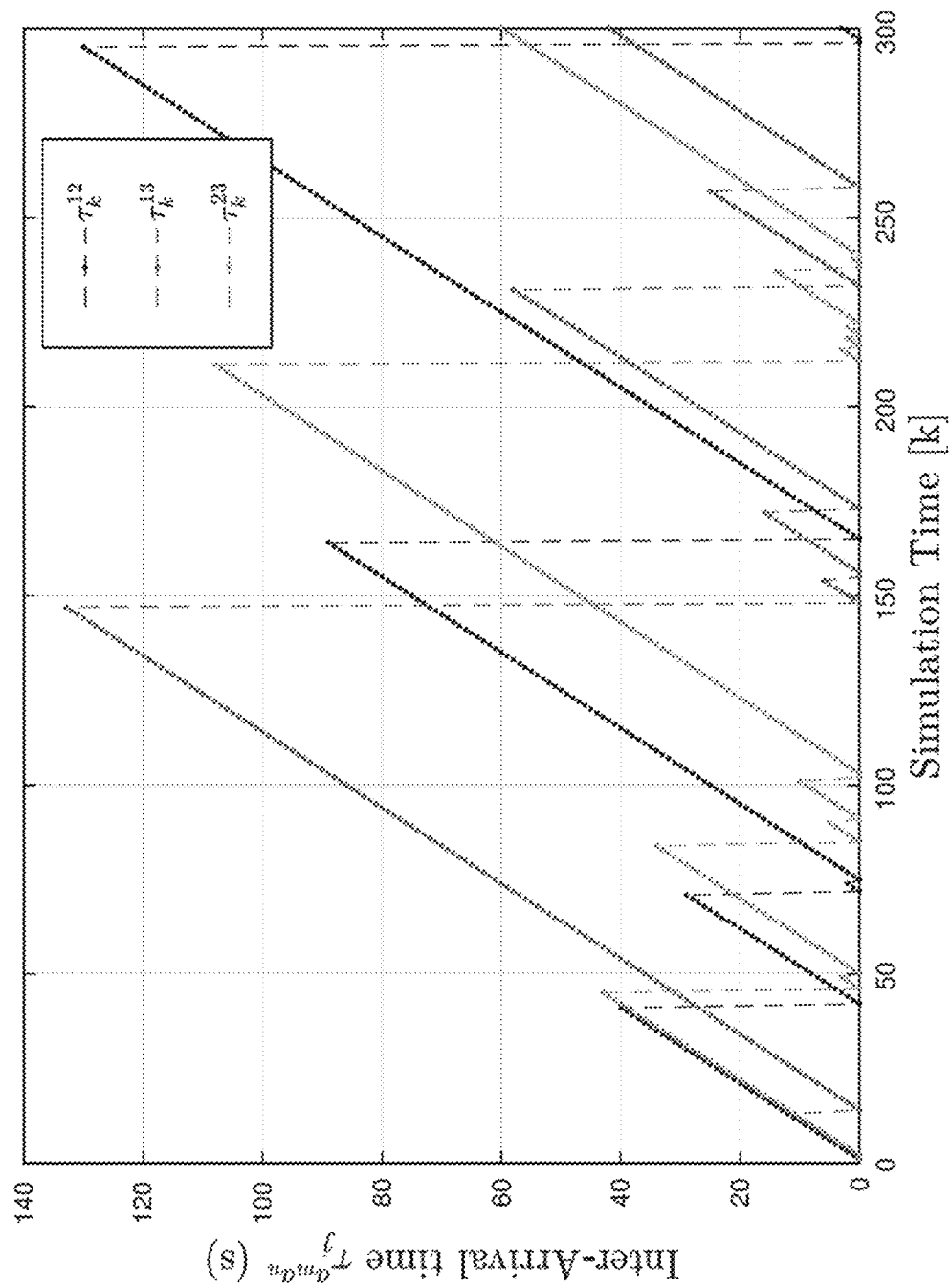
FIG. 5A is a graphical representation showing interarrival times during a simulation of three robots exploring the environment in FIG. 4.
Figure 5B:
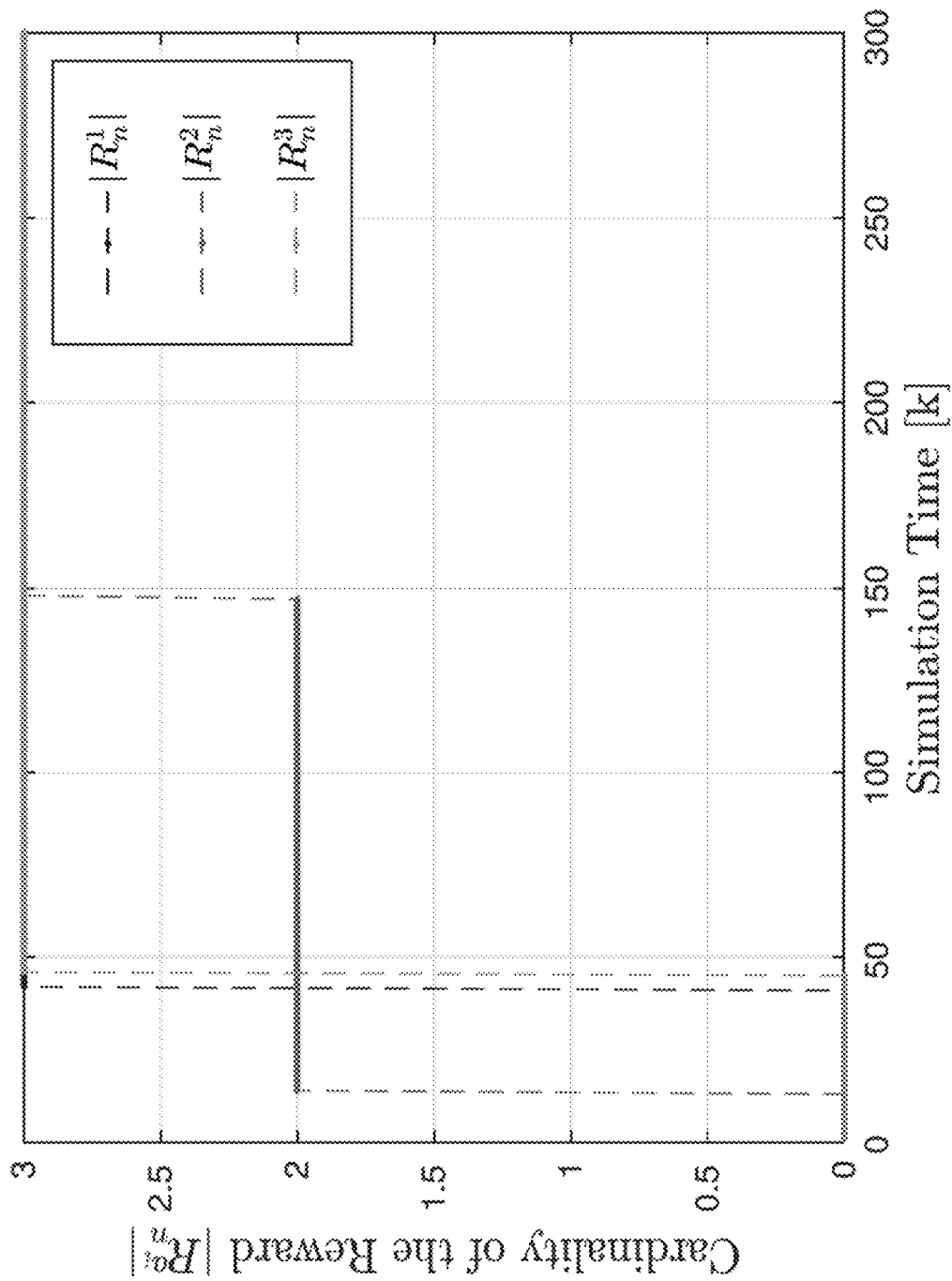
FIG. 5B is a graphical representation showing the cardinality of the reward accumulated by each of the robots at each time step.
Figure 6B:
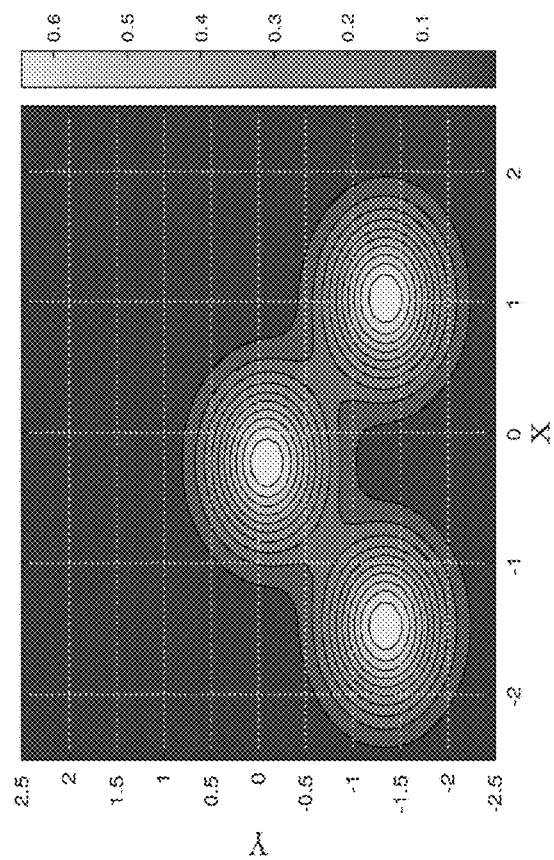
FIG. 6B is a graphical representation showing the GM-PHD intensities computed from Equation (33).
Figure 6A:
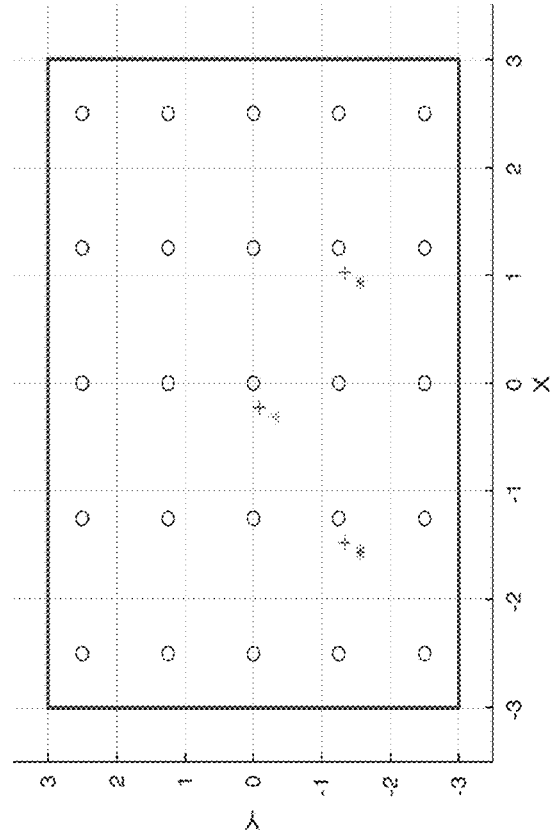
FIG. 6A is a graphical representation of multi-target tracking by robot 1 showing estimated (*) and true (+) target positions.
Figure 7B:
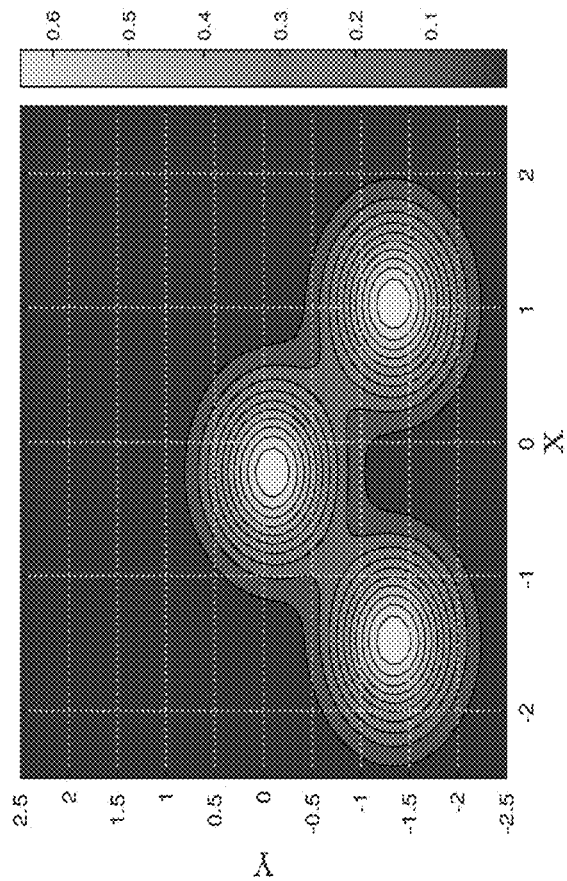
FIG. 7B is a graphical representation showing the GM-PHD intensities computed from Equation (33).
Figure 7A:
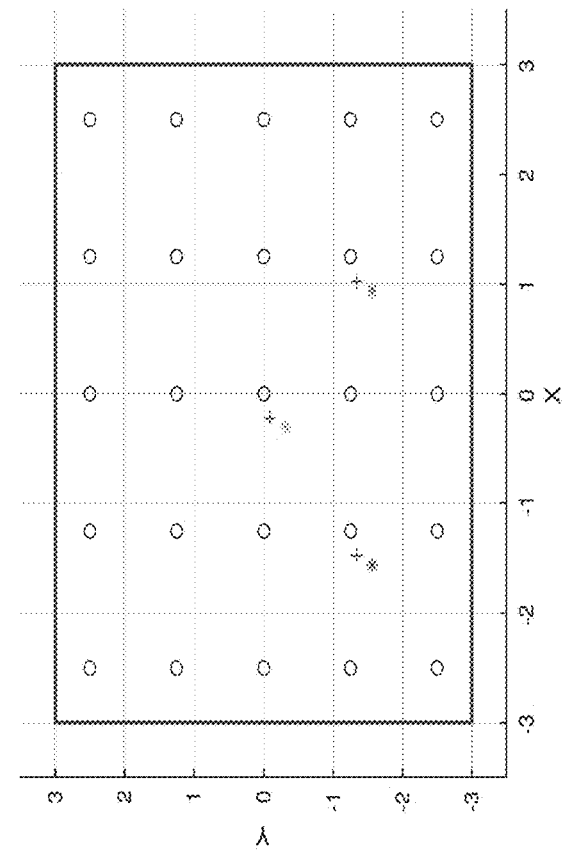
FIG. 7A is a graphical representation of multi-target tracking by robot 2 showing estimated (*) and true (+) target positions.
Figure 8B:
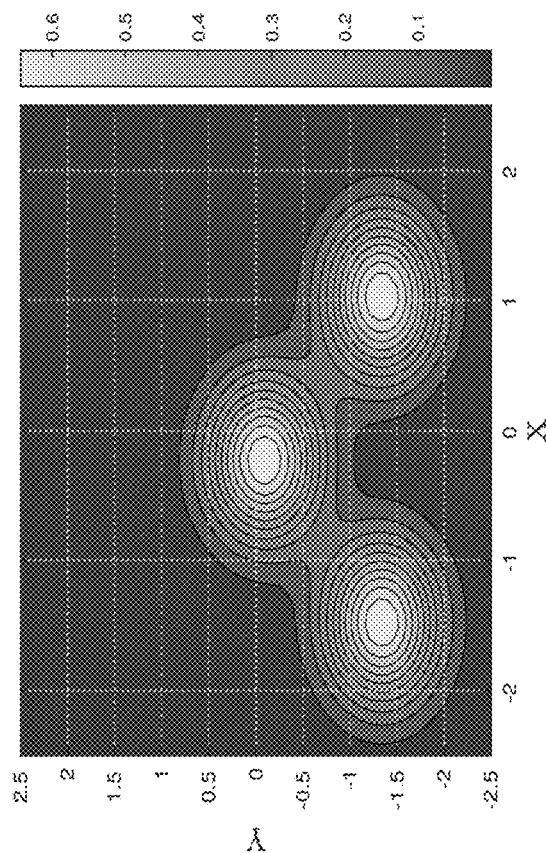
FIG. 8B is a graphical representation showing the GM-PHD intensities computed from Equation (33).
Figure 8A:
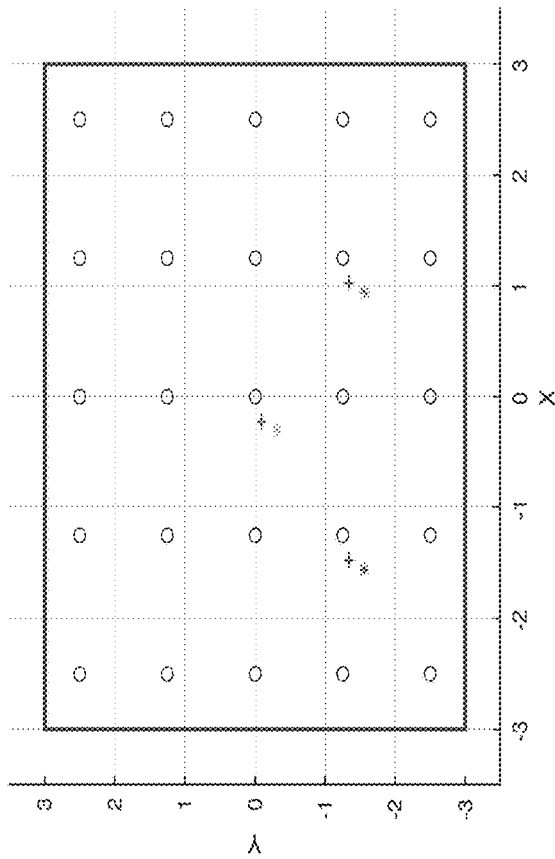
FIG. 8A is a graphical representation of multi-target tracking by robot 3 showing estimated (*) and true (+) target positions.

It is further assumed that all robots start at random positions on the grid and have no knowledge of the number of targets or their states (positions). The robots explore the environment according to the random walk model (1). As the robots detect the targets, they recursively update their estimates of the number of targets and their positions using the GM-PHD framework described herein. The system 100 sets $T = 1 \times 10^{-3}$ as the pruning threshold and U=4 as the merging distance threshold. FIG. 5A plots the inter-arrival times over time during 300 seconds of the simulation. Each inter-arrival time $r_j^{a_m a_n}$ ends at a renewal epoch, i.e. a time when any two robots $a_m$ and $a_n$ meet at a node, which can be identified in the figure as the time at the corresponding peak of the graph. At this time, the next inter-arrival time $\tau_{j+1}^{a_m a_n}$ is initialized to zero. FIG. 5B plots the time evolution of the cardinality of the reward (6) earned by each robot, which is the estimated number of targets. The average inter-arrival time over this simulation run was calculated to be $\mathbb{E}[\tau_k^{(\cdot)}] \sim 68$ s, and the time required for the cardinality of all robots' rewards to equal the actual number of targets, n=3, was $t_{reward} \sim 150$ S. Thus, for a scenario with both a robot density (number of robots per m²) and a target density (number of targets per m²) of 3/25=0.12 m⁻², there must be about $$\frac{t_{reward}}{\mathbb{E}[r_j^{(\cdot)}]} \approx 2.2 \text{ renewals,}$$

i.e. at least 2 renewals, for all robots to achieve the same reward cardinality (estimated number of targets). FIGS. 6A, 7A, and 8A show the true positions of the targets and their estimated positions by each robot at the end of the simulation time. FIGS. 6B, 7B, and 8B show the corresponding PHD intensity for each robot as a Gaussian mixture model with n=3 components (the number of targets), computed from Equation (33). We obtain the number of targets estimated by each robot $a_i$ as $$\hat{N}^{a_i} = \left[ \sum_{l=1}^{n} w_k^{(l),a_i} \right], \quad (41)$$

where the weights for robots $w_k^{(\cdot),a_i}$ are given by the peak intensities in FIGS. 6B, 7B and 8B, respectively. The estimated positions of the targets are obtained from positions of these peak intensities.

The system 100 was also evaluated through Monte Carlo simulations of three scenarios, with 100 simulation runs for each scenario. In all scenarios, 20 robots explored a grid according to the random walk model (1) in order to track a set of stationary targets. The robots were initialized at random positions on the grid, and the positions of the targets were kept the same over all 100 runs for each scenario. In Scenario 1, simulated for 1000 s, the grid has dimensions 15 m×15 m and there are 10 targets; in Scenario 2, simulated for 2000 seconds, the grid has dimensions 20 m×20 m and there are 15 targets; and in Scenario 3, simulated for 3000 seconds, the grid has dimensions 30 m×30 m and there are 20 targets. The mean inter-arrival time and mean reward percentage for each scenario, averaged over all 100 runs, are given in Table 1. The mean reward percentage is computed from the ratio of the mean number of targets detected by the robots until the mean inter-arrival time to the actual number of targets in the scenario. Table 1 shows that the mean inter-arrival time increases as the density of robots in the environment decreases, which is due to the lower rate of robots encounters with one another in larger environments, on average. The table also shows that as the density of targets in the environment decreases, the percentage of targets identified before the mean inter-arrival time increases, on average. This indicates that in the scenarios simulated, the longer inter-arrival times for larger environments tend to enable identification of a higher number of targets, despite the lower target density.

Method

Figure 9A:
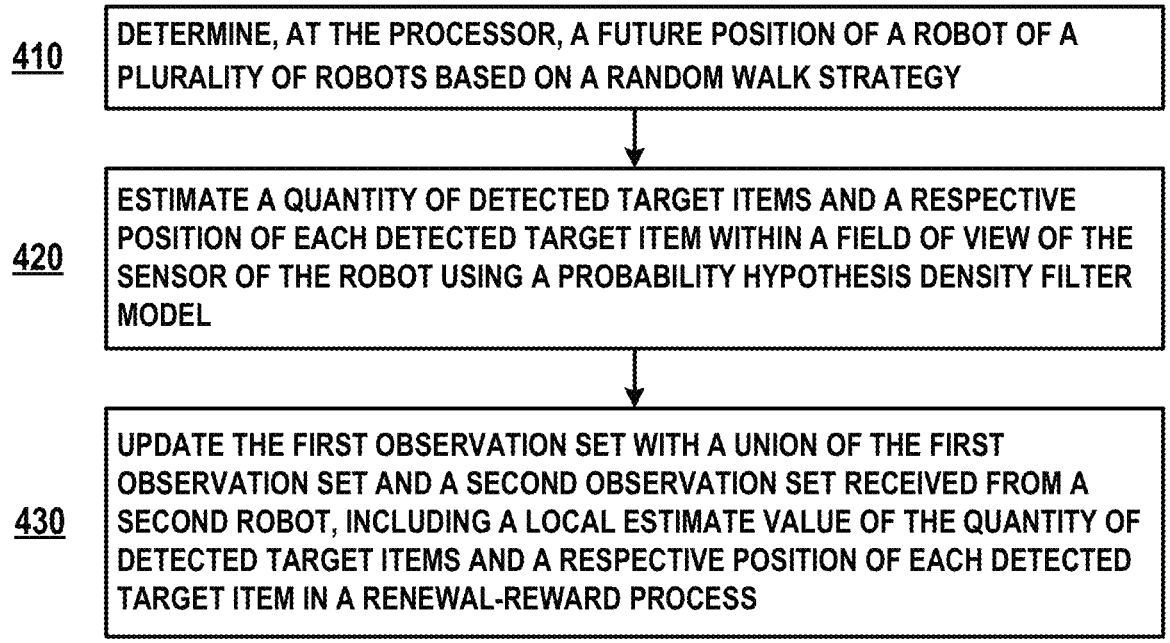
Figure 9B:
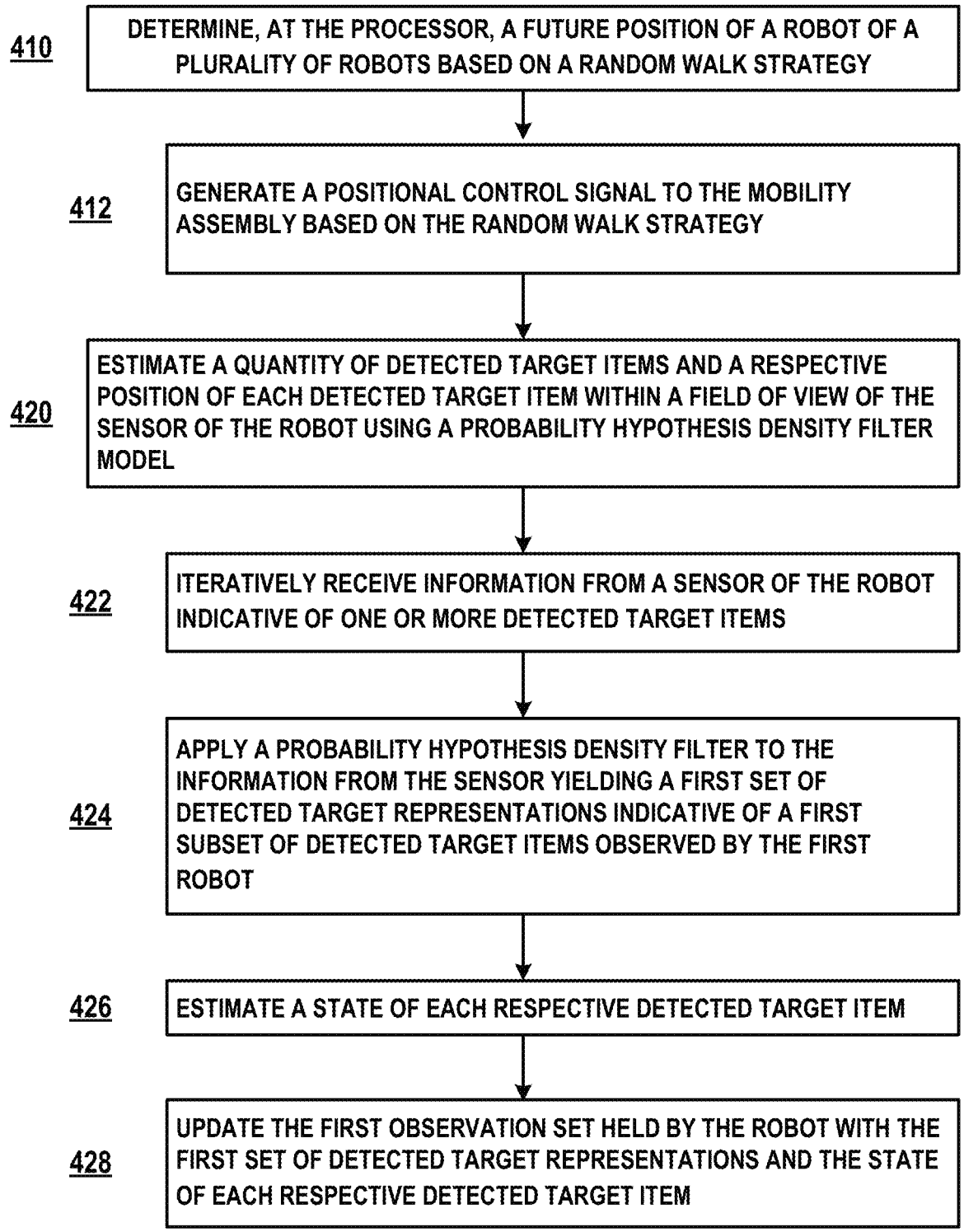

FIGS. 9A-9C are a series of process flow diagrams showing a method 400 that may be used with one or more embodiments described herein, e.g., performed by a robot 102 of the system 100 (FIGS. 1A-1C) and/or as robot control & target detection processes/services 290 discussed below with respect to FIG. 10.

Method 400 starts at block 410, which includes determining, at a processor, a future position of a robot of a plurality of robots based on a random walk strategy. Block 410 can include a sub-step shown in block 412, which includes generating, at the processor, a positional control signal to a mobility assembly of the robot based on the random walk strategy.

Block 420 includes estimating, at the processor, a quantity of detected target items and a respective position of each detected target item within a field of view of a sensor of the robot using a probability hypothesis density filter model. Block 420 can include various sub-steps, including block 422 which includes iteratively receiving, at the processor, information from the sensor of the robot indicative of one or more detected target items, block 424 which includes applying a probability hypothesis density filter to the information from the sensor yielding a first set of detected target representations indicative of a first subset of detected target items observed by the first robot, block 426 which includes estimating a state of each respective detected target item, and block 428 which includes updating the first observation set held by the robot with the first set of detected target representations and the state of each respective detected target item.

Block 430 includes updating the first observation set with a union of the first observation set and a second observation set received from a second robot, including a local estimate value of the quantity of detected target items and a respective position of each detected target item in a renewal-reward process. Block 430 can include various sub-steps, including block 432 which provides transmitting information indicative of the first observation set held by the robot at time k, the first observation set including a state for each detected target item of a first subset of detected target items observed by the first robot and block 434 which includes receiving information indicative of the second observation set held by a second robot at time k, the observation set including a state for each detected target item of a second subset of detected target items observed by the second robot.

Method 400 is iteratively repeated until the robots come to a reliable consensus on the quantity and positions of each target within the environment, where the final estimate of a quantity of detected target items is associated with a final reward value agreed upon by each robot of the plurality of robots.

Computer-Implemented System

Figure 10:
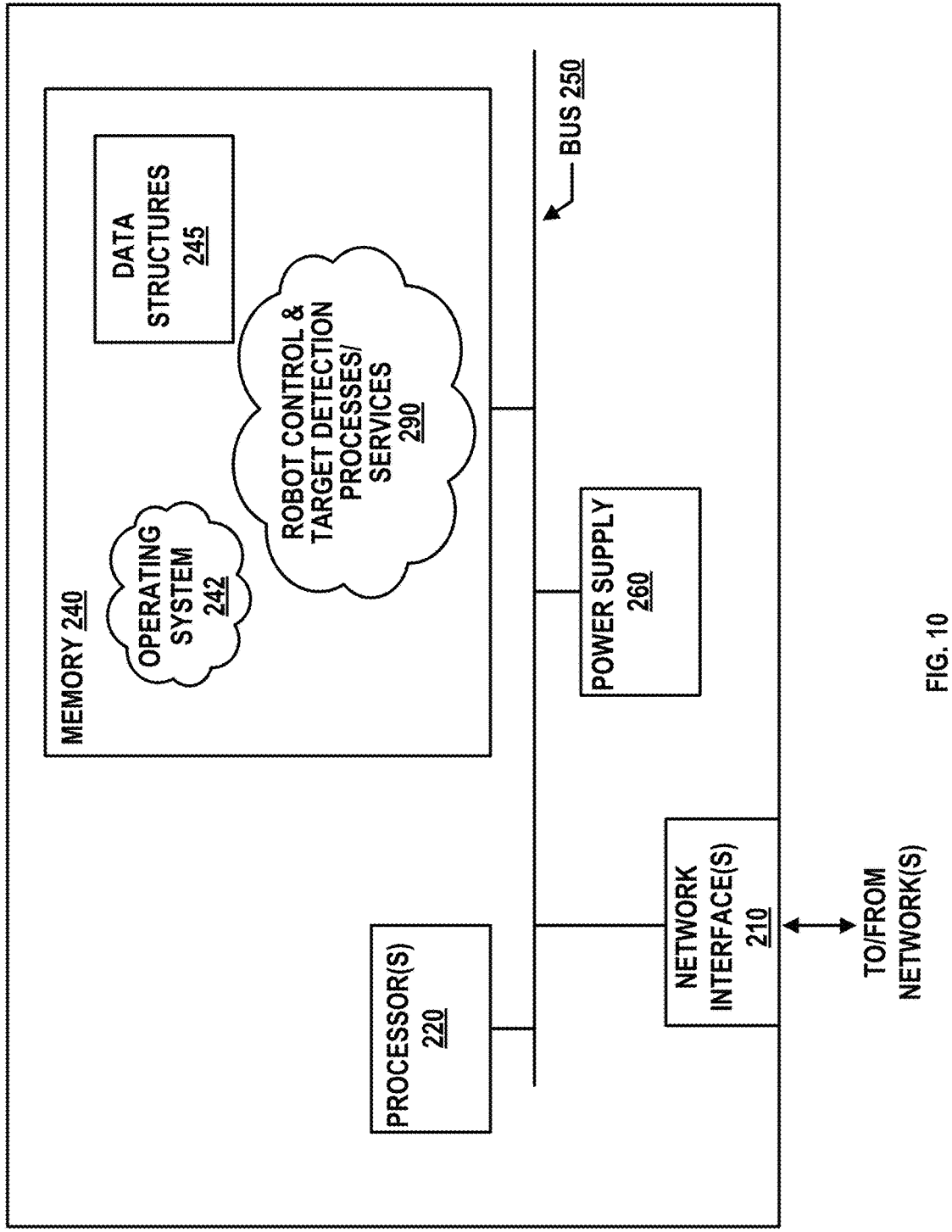
FIG. 10 is a diagram showing an example computing device for implementation of a control and target estimate strategy for the robot of FIGS. 1A-1C.

FIG. 10 is a schematic block diagram of a computing system 200 that may be used with one or more embodiments described herein, e.g., as a component of a robot 102 and implementing aspects of method 400.

Computing system 200 comprises one or more network interfaces 210 (e.g., wired, wireless etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over the communication links coupled to a communication network. Network interfaces 210 are configured to transmit and/or receive data using a variety of different communication protocols. As illustrated, the box representing network interfaces 210 is shown for simplicity, and it is appreciated that such interfaces may represent different types of network connections such as wireless and wired (physical) connections. Network interfaces 210 are shown separately from power supply 260, and/or may be an integral component coupled to power supply 260.

Memory 240 includes a plurality of storage locations that are addressable by processor 220 and network interfaces 210 for storing software programs and data structures associated with the embodiments described herein. In some embodiments, computing system 200 may have limited memory or no memory (e.g., no memory for storage other than for programs/processes operating on the device and associated caches). Memory 240 can include instructions executable by the processor 220 that, when executed by the processor 220, cause the processor 220 to implement aspects of the system 100 and the method 400 outlined herein.

Processor 220 comprises hardware elements or logic adapted to execute the software programs (e.g., instructions) and manipulate data structures 245. An operating system 242, portions of which are typically resident in memory 240 and executed by the processor, functionally organizes computing system 200 by, inter alia, invoking operations in support of software processes and/or services executing on the device. These software processes and/or services may include robot control and target detection processes/services 290 described herein, which can include aspects of method 400. Note that while robot control and target detection processes/services 290 is illustrated in centralized memory 240, alternative embodiments provide for the process to be operated within the network interfaces 210, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the robot control and target detection processes/services 290 is shown as a standalone process, those skilled in the art will appreciate that this process may be executed as a routine or module within other processes.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A robot, comprising:
a mobility assembly, wherein the mobility assembly is configured to configured to move the robot to a position within a physical area in response to a positional control signal;
a sensor, wherein the sensor is operable to detect a target item as the robot moves within the physical area; and
a processor in communication with a memory, the memory including instructions which, when executed, cause the processor to:
generate a positional control signal to the mobility assembly based on a random walk strategy;
estimate a quantity of detected target items and a respective position of each detected target item within a field of view of the sensor of the robot using a Probability Hypothesis Density filter model; and
update a local estimate value of a quantity of detected target items and a respective position of each detected target item held by the robot in a renewal-reward process based on a local estimate value received from a second robot.

2. The robot of claim 1, wherein the random walk strategy is based on a discrete-time discrete-state (DTDS) Markov chain.

3. The robot of claim 1, wherein the robot is further operable to localize itself within the physical area.

4. The robot of claim 1, wherein information exchange between the robot and the second robot occurs at a renewal epoch.

5. The robot of claim 4, wherein the renewal epoch is defined as a time step in which the robot and the second robot meet within a local communication range within the physical area.

6. The robot of claim 5, wherein the robot is configured to communicate information indicative of a first observation set including the local estimated value of a total quantity of detected target items observed by the robot and wherein the robot is configured to receive information indicative of a second observation set including a local estimated value of a total quantity of detected target items observed by the second robot at the renewal epoch.

7. The robot of claim 1, wherein the Probability Hypothesis Density filter model is formulated as a Gaussian mixture (GM-PHD).

8. The robot of claim 1, wherein the position of each detected target item is estimated at a peak of a resultant graph of the probability hypothesis density filter model.

9. A method, comprising:
providing a plurality of robots including a first robot, wherein the first robot of the plurality of robots comprises:
a mobility assembly, wherein the mobility assembly is configured to move the first robot to a position within a physical area in response to a positional control signal;
a sensor, wherein the sensor is operable to detect a target item as the first robot moves within the physical area; and
a processor in communication with a memory, the memory including instructions;
generating, at the processor of the first robot in communication with the memory of the first robot and based on one or more instructions within the memory, a positional control signal to the mobility assembly of the first robot based on a random walk strategy;
estimating, at the processor of the first robot, a quantity of detected target items and a respective position of each detected target item within a field of view of the sensor of the first robot using a Probability Hypothesis Density filter model; and
updating, at the processor of the first robot, a local estimate value of a quantity of detected target items and a respective position of each detected target item in a renewal-reward process based on a local estimated value received from a second robot.

10. The method of claim 9, wherein the random walk strategy is based on a discrete-time discrete-state (DTDS) Markov chain.

11. The method of claim 9, wherein the first robot is further operable to localize itself within the physical area.

12. The method of claim 9, wherein information exchange between the first robot and the second robot occurs at a renewal epoch.

13. The method of claim 12, wherein the renewal epoch is defined as a time step in which the first robot and the second robot meet within a local communication range within the physical area.

14. The method of claim 13, further comprising:
communicating, by the processor of the first robot and across a communication link between the first robot and the second robot, information indicative of a first observation set including the local estimated value of a total quantity of detected target items observed by the first robot; and
receiving, at the processor of the first robot and across the communication link between the first robot and the second robot, information indicative of a second observation set including a local estimated value of a total quantity of detected target items observed by the second robot at the renewal epoch.

15. The method of claim 9, wherein the Probability Hypothesis Density filter model is formulated as a Gaussian mixture (GM-PHD).

16. The method of claim 9, wherein the position of each detected target item is estimated at a peak of a resultant graph of the probability hypothesis density filter model.

17. A system, comprising:
a plurality of robots, wherein each robot of the plurality of robots is operable to move according to a random walk within a physical area, wherein each robot of the plurality of robots includes:
a sensor, wherein the sensor is operable to detect a target item as the robot moves within a physical area;
a processor in communication with the sensor and a memory, the memory including instructions, which, when executed, cause the processor to:
estimate a quantity of detected target items and a respective position of each detected target item within a field of view of the sensor of the robot using a Probability Hypothesis Density filter model; and
receive, from another robot of the plurality of robots, an estimated quantity of detected target items and a respective position of each detected target item in a reward-renewal process;
wherein a final estimate of a quantity of detected target items is associated with a final reward value agreed upon by each robot of the plurality of robots.

18. The system of claim 17, wherein the random walk is based on a discrete-time discrete-state (DTDS) Markov chain.

19. The system of claim 17, wherein the Probability Hypothesis Density filter model is formulated as a Gaussian mixture (GM-PHD).

20. The system of claim 17, wherein a position of each detected target item is estimated at a peak of a resultant graph of the probability hypothesis density filter model.

* * * * *